US012804479B2

(12) United States Patent
Yang et al.

(10) Patent No.: US 12,804,479 B2
(45) Date of Patent: Nov. 17, 2026

(54) CELL HANDOVER METHOD, TERMINAL, AND NETWORK SIDE DEVICE

(71) Applicant: VIVO MOBILE COMMUNICATION CO., LTD., Dongguan (CN)

(72) Inventors: Kun Yang, Dongguan (CN); Dajie Jiang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 273 days.

(21) Appl. No.: 18/604,037

(22) Filed: Mar. 13, 2024

(65) Prior Publication Data

US 2024/0224130 A1 Jul. 4, 2024

Related U.S. Application Data

(63) Continuation of application No. PCT/CN2022/118613, filed on Sep. 14, 2022.

(30) Foreign Application Priority Data

Sep. 14, 2021 (CN) ......................... 202111076977.8

(51) Int. Cl.

| | |
|---|---|
| ***H04W 36/00*** | (2009.01) |
| ***H04W 36/08*** | (2009.01) |
| ***H04W 36/30*** | (2009.01) |
| ***H04W 56/00*** | (2009.01) |
| ***H04W 76/10*** | (2018.01) |

(52) U.S. Cl.

CPC ....... *H04W 36/0058* (2018.08); *H04W 36/08* (2013.01); *H04W 36/302* (2023.05); *H04W 56/0045* (2013.01); *H04W 76/10* (2018.02)

(58) Field of Classification Search

CPC ................................................ H04W 36/0058

See application file for complete search history.

(56) References Cited

U.S. PATENT DOCUMENTS

| | | | | |
|---|---|---|---|---|
| 9,264,961 | B1 * | 2/2016 | Shah ............... | H04W 36/00835 |
| 2019/0174384 | A1 | 6/2019 | Kim et al. | |
| 2019/0357101 | A1 * | 11/2019 | Stojanovski ........ | H04W 36/302 |

(Continued)

FOREIGN PATENT DOCUMENTS

| | | | |
|---|---|---|---|
| CN | 108282838 | A | 7/2018 |
| CN | 111095824 | A | 5/2020 |

(Continued)

OTHER PUBLICATIONS

KDDI Corporation, "KDDI's view on Rel-18", 3GPP TSG RAN Rel-18 workshop, Electronic Meeting, Jun. 28-Jul. 2, 2021, RWS-210136.

(Continued)

*Primary Examiner* — Pamit Kaur

(74) *Attorney, Agent, or Firm* — The Webb Law Firm

(57) ABSTRACT

A cell handover method includes obtaining, by a network side device, first information; and scheduling, by the network side device, cell handover according to the first information. The first information includes at least one of the measurement results of a first serving cell and at least one first cell, or scheduling information; the first cell is a neighboring cell of the first serving cell, or a second serving cell of the terminal; and the first serving cell and the at least one first cell are cells sharing an auxiliary device.

20 Claims, 8 Drawing Sheets

(56) References Cited

U.S. PATENT DOCUMENTS

| | | | | |
|---|---|---|---|---|
| 2020/0196225 | A1 * | 6/2020 | Wang | H04W 76/11 |
| 2021/0306895 | A1 | 9/2021 | Chen et al. | |
| 2022/0038964 | A1 * | 2/2022 | Wang | H04W 36/322 |
| 2023/0007522 | A1 | 1/2023 | Yang et al. | |
| 2023/0009770 | A1 | 1/2023 | Li | |
| 2023/0328573 | A1 | 10/2023 | Yang et al. | |

FOREIGN PATENT DOCUMENTS

| | | | |
|---|---|---|---|
| CN | 111314952 | A | 6/2020 |
| CN | 113382419 | A | 9/2021 |
| CN | 114554520 | A | 5/2022 |
| EP | 2645605 | B1 | 8/2021 |
| WO | 2021096225 | A1 | 5/2021 |
| WO | 2022133957 | A1 | 6/2022 |

OTHER PUBLICATIONS

China Unicom, "China Unicom Views on Rel-18", 3GPP TSG RAN Rel-18 workshop, Electronic Meeting, Jun. 28-Jul. 2, 2021, RWS-210392.

Xu, Bilian et al., Reconfigurable Intelligent Surface Configuration and Deployment in Three-dimensional Scenarios, 2021 IEEE International Conference on Communications Workshops (ICC Workshops), IEEE, Jun. 14, 2021, pp. 1-6, XP033938638.

* cited by examiner

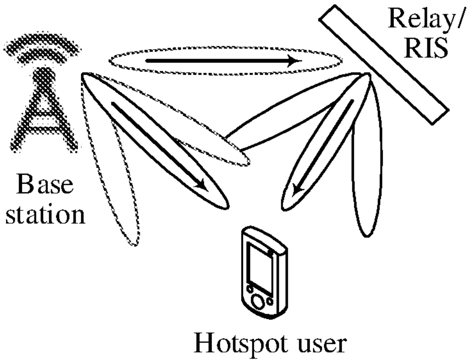

FIG. 3

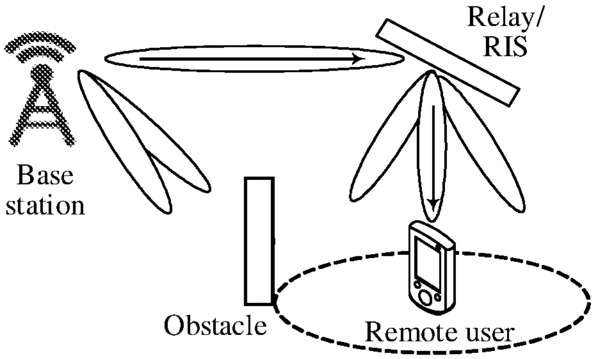

FIG. 4

A network side device obtains first information, where the first information includes at least one of the following: measurement results of a first serving cell and at least one first cell, or scheduling information; the first cell is a neighboring cell of the first serving cell, or a second serving cell of the terminal; and the first serving cell and the at least one first cell are cells sharing an auxiliary device — 101

↓

The network side device schedules cell handover according to the first information — 102

FIG. 5

CELL HANDOVER METHOD, TERMINAL, AND NETWORK SIDE DEVICE

CROSS-REFERENCE TO RELATED APPLICATIONS

This application is a Bypass Continuation Application of International Patent Application No. PCT/CN2022/118613, filed Sep. 14, 2022, and claims priority to Chinese patent application Ser. No. 202111076977.8, filed Sep. 14, 2021, the disclosures of which are hereby incorporated by reference in their entireties.

BACKGROUND OF THE INVENTION

Field of the Invention

This application relates to the field of mobile communication technologies, and in particular, to a cell handover method, a terminal, and a network side device.

Description of Related Art

A programmable/reconfigurable intelligent surface (RIS) device is an emerging artificial material device. The RIS device may dynamically/semi-statically change electromagnetic characteristics of the RIS device, and affect a reflection/refraction behavior of an electromagnetic wave incident on the RIS device. The RIS device controls a reflected wave/refracted wave of the electromagnetic wave, to implement a function such as beam sweeping/beamforming. The RIS device may be used in a scenario of hotspot traffic enhancement or coverage hole filling.

SUMMARY OF THE INVENTION

Embodiments of this application provide a cell handover method and apparatus, a terminal, and a network side device.

According to a first aspect, a cell handover method is provided, including:

obtaining, by a network side device, first information; and scheduling, by the network side device, cell handover according to the first information, where the first information includes at least one of the following: measurement results of a first serving cell and at least one first cell, or scheduling information; the first cell is a neighboring cell of the first serving cell, or a second serving cell of the terminal; and the first serving cell and the at least one first cell are cells sharing an auxiliary device.

According to a second aspect, a cell handover method is provided, including:

obtaining, by a terminal, measurement results of a first serving cell and at least one first cell of the terminal; and performing, by the terminal, cell handover based on the measurement results of the first serving cell and the at least one first cell, where the first cell is a neighboring cell of the first serving cell, or a second serving cell of the terminal; and the first serving cell and the at least one first cell are cells sharing an auxiliary device.

According to a third aspect, a cell handover apparatus is provided, including:

an obtaining module, configured to obtain first information; and a processing module, configured to schedule cell handover according to the first information, where the first information includes at least one of the following: measurement results of a first serving cell and at least one first cell, or scheduling information; the first cell is a neighboring cell of the first serving cell, or a second serving cell of the terminal; and the first serving cell and the at least one first cell are cells sharing an auxiliary device.

According to a fourth aspect, a cell handover apparatus is provided, including:

an obtaining module, configured to obtain measurement results of a first serving cell and at least one first cell of the terminal; and a processing module, configured to perform cell handover based on the measurement results of the first serving cell and the at least one first cell, where the first cell is a neighboring cell of the first serving cell, or a second serving cell of the terminal; and the first serving cell and the at least one first cell are cells sharing an auxiliary device.

According to a fifth aspect, a network side device is provided, including a processor, a memory, and a program or instructions stored in the memory and executable on the processor, where when the program or instructions are executed by the processor, the steps of the method according to the first aspect are implemented.

According to a sixth aspect, a network side device is provided, including a processor and a communication interface. The communication interface is configured to obtain first information, and the processor is configured to schedule cell handover according to the first information, where the first information includes at least one of the following: measurement results of a first serving cell and at least one first cell of a terminal, or scheduling information; the first cell is a neighboring cell of the first serving cell, or a second serving cell of the terminal; and the first serving cell and the at least one first cell are cells sharing an auxiliary device.

According to a seventh aspect, a terminal is provided, including a processor, a memory, and a program or instructions stored in the memory and executable on the processor, where when the program or instructions are executed by the processor, the steps of the method according to the second aspect are implemented.

According to an eighth aspect, a terminal is provided, including a processor and a communication interface. The communication interface is configured to obtain measurement results of a first serving cell and at least one first cell of the terminal, and the processor is configured to perform cell handover based on the measurement results of the first serving cell and the at least one first cell, where the first cell is a neighboring cell of the first serving cell, or a second serving cell of the terminal; and the first serving cell and the at least one first cell are cells sharing an auxiliary device.

According to a ninth aspect, a non-transitory readable storage medium is provided, the non-transitory readable storage medium storing a program or instructions, where when the program or instructions are executed by the processor, the steps of the method according to the first aspect or the steps of the method according to the second aspect are implemented.

According to a tenth aspect, a chip is provided, including a processor and a communication interface, the communication interface being coupled to the processor, and the processor being configured to execute a program or instructions to implement the method according to the first aspect or the method according to the second aspect.

According to an eleventh aspect, a computer program/program product is provided. The computer program/program product is stored in a non-transient storage medium, and the computer program/program product is executed by at least one processor to implement the steps of the method according to the first aspect or the second aspect.

BRIEF DESCRIPTION OF THE DRAWINGS

FIG. 3 is a second schematic diagram of a scenario according to an embodiment of this application;

FIG. 4 is a third schematic diagram of a scenario according to an embodiment of this application;

FIG. 5 is a first schematic flowchart of a cell handover method according to an embodiment of this application;

DESCRIPTION OF THE INVENTION

The following clearly describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application fall within the protection scope of this application.

In the specification and the claims of this application, the terms "first", "second", and so on are intended to distinguish similar objects but do not necessarily indicate a specific order or sequence. It is to be understood that the term used in such a way is interchangeable in proper circumstances, so that the embodiments of this application can be implemented in other sequences than the sequence illustrated or described herein. In addition, the objects distinguished by "first", "second", and the like are usually of one type, and a quantity of objects is not limited, for example, there may be one or more first objects. In addition, "and/or" used in the specification and the claims represents at least one of the connected objects, and a character "/" in this specification generally indicates an "or" relationship between the associated objects.

It is to be noted that, the technologies described in the embodiments of this application are not limited to a long term evolution (LTE)/LTE-Advanced (LTE-A) system, or may be applied to other wireless communication systems such as code division multiple access (CDMA), time division multiple access (TDMA), frequency division multiple access (FDMA), orthogonal frequency division multiple access (OFDMA), single-carrier frequency-division multiple access (SC-FDMA), and another system. In the embodiments of this application, the terms "system" and "network" are usually interchangeably used, and the technology described herein can be applied to the systems and radio technologies mentioned above, and can also be applied to other systems and radio technologies. Although the technologies are also applicable to applications other than NR system applications, for example, a 6-th generation (6G) communication system, a new radio (NR) system is exemplarily described in the following descriptions, and the term "NR" is used in most of the following descriptions.

Figure 2:
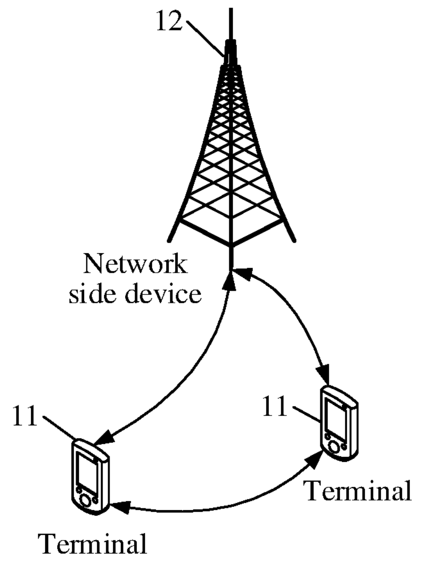
FIG. 2 is a structural diagram of a wireless communication system to which an embodiment of this application is applicable.

FIG. 2 is a structural diagram of a wireless communication system to which an embodiment of this application is applicable. The communication system includes a terminal 11 and a network side device 12. The terminal 11 may also be referred to as a terminal device or a user equipment (UE). The terminal 11 may be a terminal side device such as a mobile phone, a tablet personal computer, a laptop computer or notebook computer, a personal digital assistant (PDA), a palmtop computer, a notebook, an ultra-mobile personal computer (UMPC), a mobile Internet device (MID), an augmented reality (AR)/virtual reality (VR) device, a robot, a wearable device, a vehicle user equipment (VUE), a pedestrian user equipment (PUE), a smart household (which is a household device having a wireless communication function, for example, a refrigerator, a television, a washing machine, or furniture), or the like. The wearable device includes: a smart watch, a smart bracelet, a smart headset, smart glasses, smart jewelry (a smart bangle, a smart chain bracelet, a smart ring, a smart necklace, a smart ankle bangle, a smart anklet, or the like), a smart wristband, smart clothing, a game console, and the like. It is to be noted that, a specific type of the terminal 11 is not limited in the embodiments of this application. The network side device 12 may be a base station or a core network. The base station may be referred to as a node B, an evolved node B, an access point, a base transceiver station (BTS), a radio base station, a radio transceiver, a basic service set (BSS), an extended service set (ESS), a B node, an evolved B node (eNB), a home B node, a home evolved B node, a WLAN access point, a Wi-Fi node, a transmitting receiving point (TRP), or another suitable term in the field. The base station is not limited to a specific technical term as long as the same technical effect is achieved. It is to be noted that, in the embodiments of this application, a base station in the NR system is only used as an example, but a specific type of the base station is not limited thereto.

In an embodiment, the method in the embodiments of this application may be applied to another wireless communication system. The wireless communication system includes a terminal, an auxiliary device, and a network side device. The auxiliary device includes a RIS device or a relay device. Optionally, the relay device may be a Layer 1 (L1) relay/repeator with a beamforming function.

A working principle and working characteristics of the auxiliary device based on the RIS device are as follows:

The RIS device includes a front-end artificial surface and a back-end control module. The front-end artificial surface includes artificial device units that are closely and evenly arranged. Electromagnetic characteristics of the device units are affected by a control signal/bias voltage of a device. Different control signals/bias voltages correspond to different reflection coefficients/refraction coefficients. Changes in the reflection coefficient/refraction coefficient may affect a phase and/or strength of a reflection/refraction signal. Microscopically, each device unit generates independent reflection/refraction signals. Macroscopically, the signals are superimposed to further achieve control on electromagnetic waves. The control signal/bias voltage is provided by the back-end control module.

The RIS device may be used in a scenario of hotspot traffic enhancement or coverage hole filling.

Future radio services may include a data service with a large number of traffic (for example, AR/VR, a high-definition video, or the like) or another hotspot service that has a higher requirement on a radio channel. As shown in FIG. 3, for a hotspot requirement of a hotspot user, a serving cell dynamically activates the auxiliary device (such as the transmitting receiving point TRP and the RIS device), to increase beams available for the hotspot user, thereby meeting hotspot service requirements.

Obstacles within cell coverage cause a coverage hole, or a wireless signal has weak strength/a low SINR in a hole region or a cell edge region due to large-scale fading and neighboring cell signal interference at a cell edge. Consequently, communication quality is affected. This phenomenon is more common in a high-frequency wave band/millimeter wave band. As shown in FIG. 4, the RIS device is a device independent of the base station, may be deployed at a visible position far away from the base station, and provides a communication service for the coverage hole or the cell edge region by forwarding/reflecting a signal of the base station. Reasonable node deployment prevents the RIS device from being blocked by the obstacles and ensures good signal coverage.

The reconfigurable intelligent surface RIS device has a capability to affect a surrounding wireless signal propagation environment. The reconfigurable intelligent surface RIS device affects energy distribution of the reflection signal while generating beams in different directions, which changes multipath energy and phase distribution in a wireless environment. When the reconfigurable intelligent surface RIS device changes, signal strength and a channel response parameter of a received signal of a terminal device/network side device need to be measured/estimated again.

The difference between channel changes caused by the RIS device and conventional channel changes is as follows: a) The channel changes caused by the RIS device are quick-varying, and the conventional channel changes are slow-varying. Changes in control voltages of the device in the RIS device can complete high and low level conversion in nanoseconds ns to microseconds us, while a conventional radio channel change speed or channel time correlation is determined by a change speed (including a moving speed of the terminal and a moving speed of reflecting/obstructing objects) of the surrounding propagation environment. Changes in a radio channel are slow-varying, and time correlation may reach a millisecond level or a higher level. b) The channel changes caused by the RIS device are periodic, and the conventional channel changes are absolutely random. The changes caused by the RIS device and an impact of the RIS device on a nearby channel environment are controlled by the control module of the RIS device. The RIS device may periodically change a RIS reflection parameter. In a slow-varying channel environment, other parameters of the channel environment do not change in several change periods of the RIS device, and receive channel response of the terminal may be characterized by periodic changing.

In an embodiment, the RIS device or the L1 relay is deployed at the cell edge and is configured to enhance signal quality of a user at the cell edge. However, considering that the RIS device or the L1 relay cannot autonomously generate data information and can only forward a signal from the base station, the RIS device can forward a valid signal only when the base station sends a signal to the RIS device or the terminal within coverage of the RIS device sends an uplink signal to the RIS device. The RIS device is in a non-working state in other time periods, and correspondingly, in a time period in which the RIS device does not work, the terminal within the coverage of the RIS device is in a dormant/silent state according to an instruction of the base station or directly communicates with the base station.

In consideration of base station scheduling, the base station needs to ensure a communication service with terminals in all directions, and therefore, only in some time periods, a downlink link can be sent to the RIS device or the uplink signal sent by the terminal within the coverage of the RIS device can be received. The RIS device may forward a signal of a base station corresponding to another cell in other time periods, to further provide a service for users at an edge of the another cell. In such a scenario, users in a boundary region of a plurality of cells share, in a time division multiplexing manner, a coverage enhancement service provided by the RIS device.

The RIS device may be shared by a plurality of cells, that is, provide a service for users of different cells respectively. In such a deployment scenario, the coverage of the RIS device is a transition region of the plurality of cells, which achieves cell soft handover for the user, and avoids cell hard handover when the signal quality of the user is too low.

Figure 1:
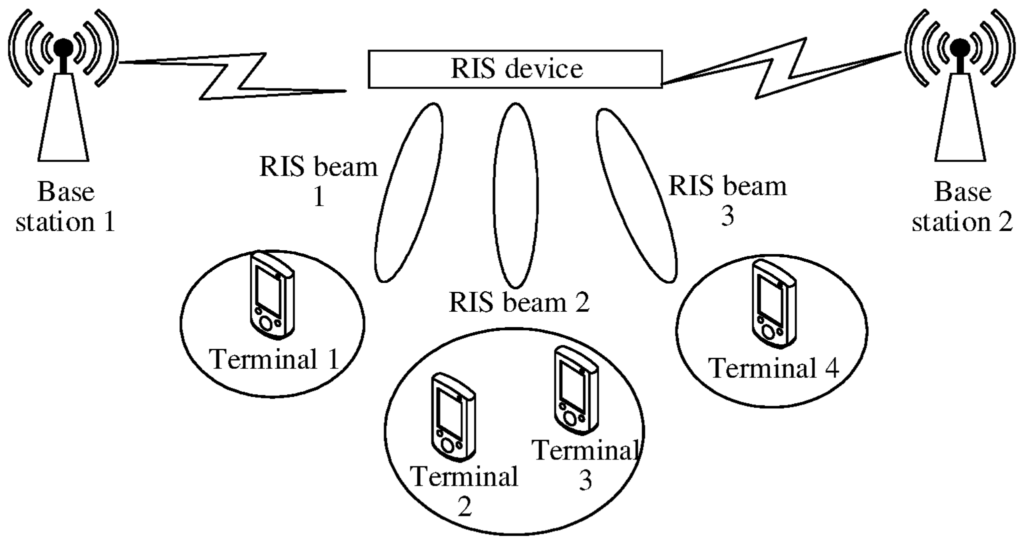
FIG. 1 is a first schematic diagram of a scenario according to an embodiment of this application.

When a plurality of base stations share the RIS device, signals of the plurality of base stations detected by a terminal side are all affected by a forwarded beam of the RIS device. As shown in FIG. 1, the RIS device cyclically forwards signals of a base station 1 and a base station 2 sequentially in a time division multiplexing manner, and a RIS beam pointing to the terminal may be used for forwarding a signal of a base station 1, or may be used for forwarding a signal of a base station 2 in another time period. From the perspective of the terminal, the signals of the base station 1 and the base station 2 are forwarded in a same beam of the RIS device, and therefore, signal strength of the base station 1 and signal strength of the base station 2 are slightly different. In the foregoing scenarios, introduction of the auxiliary device such as the RIS device makes signal strength distribution of a cell boundary region very complex, no longer change with a distance to the base station, but also be affected by coverage planning of the RIS device. How to perform cell handover becomes a problem urgently needs to be resolved by a person skilled in the art.

In a solution of this embodiment of this application, the network side device schedules cell handover according to measurement results of a first serving cell and at least one first cell that share the auxiliary device, and/or scheduling information and/or a handover request of the terminal.

With reference to the accompanying drawings, the cell handover method provided in the embodiments of this application is described in detail below by using some embodiments and application scenarios thereof.

FIG. 5 is a first schematic flowchart of a cell handover method according to an embodiment of this application. As shown in FIG. 5, the cell handover method provided in the embodiments includes the following steps:

Step 101: A network side device obtains first information.

The first information includes at least one of the following: measurement results of a first serving cell and at least one first cell, or scheduling information; the first cell is a neighboring cell of the first serving cell, or a second serving cell of the terminal; and the first serving cell and the at least one first cell are cells sharing an auxiliary device.

The auxiliary device may be shared by a plurality of cells. It may be understood that, network side devices of a plurality of cells share the auxiliary device in a time division multiplexing manner or a space division multiplexing manner. The time division multiplexing manner means that different network side devices control the auxiliary device in different time periods, and the auxiliary device performs beam forwarding on a downlink signal of a corresponding network side device or an uplink signal of a terminal of a corresponding cell in a corresponding time period. The space division multiplexing manner means that different network side devices send signals to the auxiliary device by using beams in different directions in a same time period, and the auxiliary device forwards incident signals in different directions to different beam directions, so that different cell signals are distinguished from each other, thereby providing signals for terminals in different beam regions, which utilizes time and space resources to the greatest extent, and enhances signal quality of a cell edge region.

Optionally, the network side device obtains first information. The first information may include measurement results and/or scheduling information, where the measurement results may be measurement results of the first serving cell and the first cell of the terminal. Optionally, the measurement results are reported by the terminal to the network side device.

The scheduling information includes at least one of the following: a quantity of terminals within coverage of the auxiliary device, service information of the terminal, or forwarded beam information of the auxiliary device. The forwarded beam information of the auxiliary device includes, for example, at least one of the following information such as a reference signal, a port number, a serving cell, or a network side device corresponding to a forwarded beam. The service information of the terminal is service information of a terminal in coverage of the auxiliary device.

Optionally, the terminal may have a plurality of serving cells. The first serving cell may be a primary serving cell of the terminal, that is, a main serving cell. The second serving cell may be a secondary serving cell of the terminal, that is, a minor serving cell. The terminal may perform primary and secondary serving cell handover between the first serving cell and the second serving cell.

Optionally, the terminal may further perform handover between the serving cell and the neighboring cell.

Step 102: The network side device schedules cell handover according to the first information.

Optionally, the network side device schedules cell handover according to the first information. Assuming that the first information includes the measurement results, that cell handover is scheduled according to the measurement results means that measurement results of different cells are compared. If a handover condition is met, the terminal is scheduled to perform cell handover, for example, the terminal is handed over from a current first serving cell to a target cell or perform primary and secondary cell handover, that is, the target cell is used as a primary serving cell, and the current first serving cell is used as a secondary serving cell. The handover condition includes that, for example, a measurement result of the target cell to be handed over is superior to a measurement result of the current first serving cell, and may include that a difference between the measurement result of the target cell to be handed over and the measurement result of the current first serving cell is greater than a threshold, where the threshold may be preset.

Assuming that the first information includes the scheduling information, the network side device determines, according to the scheduling information, whether the terminal performs cell handover. For example, when a quantity of terminals in a current serving cell is large, a quantity of terminals served by another cell is small, and in this case, the terminal may be handed over from the current serving cell to the another cell. For example, when a service used by a current terminal is a voice service, a quantity of terminals in the current serving cell that use the voice service is large, and in this case, the terminal may be handed over to another cell that provides the voice service.

The network side device may also determine cell handover in comprehensive consideration of the measurement results and the scheduling information.

Optionally, the network side device schedules cell handover according to a handover request of the terminal. The terminal may determine, based on measurement results of different cells, whether to perform cell handover. If cell handover is to be performed, the terminal sends the handover request to the network side device, so that the network side device schedules cell handover.

In the method of this embodiment, the network side device may schedule cell handover for the terminal based on measurement results of a plurality of cells and/or scheduling information. The plurality of cells share the auxiliary device. The plurality of cells include the first serving cell and the at least one first cell of the terminal. The first cell may be a neighboring cell of the first serving cell, or may be a second serving cell of the terminal. A solution for the terminal to perform cell handover in a communication scenario in which there is an auxiliary device is implemented by using the measurement results of the cells and/or the scheduling information.

In an embodiment, the first information includes the measurement results of the first serving cell and the at least one first cell of the terminal, and step 102 may be implemented as follows:

The network side device schedules cell handover according to the measurement results of the first serving cell and the at least one first cell, and a working status of the auxiliary device.

It may be understood that, the working status of the auxiliary device includes a working state and a non-working state. When the auxiliary device is in the working state, that is, when the auxiliary device works, the auxiliary device forwards a signal of the network side device or forwards an uplink signal sent by the terminal. When the auxiliary device is in the non-working state, that is, when the auxiliary device does not work, the auxiliary device does not forward a signal for any network side device.

The measurement results of the plurality of cells may be affected by the working status of the auxiliary device. When the network side device determines whether the terminal performs cell handover, the working status of the auxiliary device needs to be considered.

Optionally, the step in which the network side device schedules cell handover according to the measurement results of the first serving cell and the at least one first cell, and the working status of the auxiliary device may be implemented in the following manners:

in a case that the auxiliary device does not work, scheduling, by the network side device, cell handover according to the measurement result of the first serving cell and the measurement result of the at least one first cell; and in a case that the auxiliary device works, scheduling, by the network side device, cell handover according to measurement results of the first serving cell and the at least one first cell of the terminal in a same beam forwarded by the auxiliary device.

Optionally, when the auxiliary device does not work, signals of the plurality of cells may be measured, that is, the measurement result of the current first serving cell and the measurement result of the first cell are measured. In this case, the signals of the cells are not affected by the forwarded beam of the auxiliary device.

A time period in which the auxiliary device does not work may be a time window explicitly configured by the network side device, or may be implicitly derived according to an available time window in which the auxiliary device serves each cell. The solution is applicable to a scenario in which a time period of the first cell in which the auxiliary device is occupied and a beam configuration situation are unknown.

When the auxiliary device works, the current first serving cell and the first cell of the terminal share the auxiliary device, and therefore, the signals of the cells are affected by the forwarded beam of the auxiliary device. The measurement results are measurement results of the cells in the same beam forwarded by the auxiliary device.

For example, the terminal obtains a measurement result of the current first serving cell in at least one beam forwarded by the auxiliary device, for example, in at least one of three beams in FIG. 1, and obtains a measurement result of the first cell in at least one beam forwarded by the auxiliary device. The at least one beam corresponding to the first cell is the same as the at least one beam corresponding to the first serving cell. For example, the at least one beam corresponding to the first serving cell is a beam 1, and the at least one beam corresponding to the first cell is also the beam 1.

The measurement results of the cells in the at least one beam are processed, for example, may be weighted to obtain a final measurement result, or a measurement result corresponding to a beam selected from the beams is used as a final measurement result. Optionally, the measurement result corresponding to the selected beam may be a best measurement result in a measurement beam in all beams forwarded by the auxiliary device. Optionally, the measurement result may be represented by a signal to interference noise ratio (SINR), or reference signal received power (RSRP), or reference signal received quality (RSRQ).

Optionally, when the auxiliary device does not work, the network side device schedules cell handover in a case that a difference between a measurement result of a second cell and the measurement result of the first serving cell is greater than a first threshold; and when the auxiliary device works, the network side device schedules cell handover in a case that a difference between measurement results of the second cell and the first serving cell in the same beam forwarded by the auxiliary device is greater than a second threshold.

The second cell is any cell in the at least one first cell.

Optionally, when the auxiliary device does not work, that the difference between the measurement result of the second cell and the measurement result of the first serving cell is greater than the first threshold indicates that the measurement result of the second cell is superior to the measurement result of the first serving cell, and in this case, the terminal may be handed over to the second cell, or primary and secondary serving cell handover may be performed.

When the auxiliary device works, that the difference between the measurement results of the second cell and the first serving cell in the same beam forwarded by the auxiliary device is greater than the second threshold indicates that the measurement result of the second cell is superior to the measurement result of the first serving cell in the same beam forwarded by the auxiliary device, and in this case, the terminal may be handed over to the second cell, or primary and secondary serving cell handover may be performed.

In the foregoing implementation, since the signals of the cells are affected by the forwarded beam of the auxiliary device, the working status of the auxiliary device affects the measurement results of the cells. Cell handover is scheduled according to the measurement results of the cells and the working status of the auxiliary device, which makes a decision for cell handover more accurate.

In an embodiment, the step in which the network side device schedules cell handover according to the measurement results of the first serving cell and the at least one first cell, and the working status of the auxiliary device may be implemented in the following manners:

in a case that a serving cell of the terminal includes the first serving cell and at least one second serving cell, scheduling, by the network side device, primary and secondary serving cell handover according to the measurement results of the first serving cell and the at least one second serving cell, and the working status of the auxiliary device; or in a case that a serving cell of the terminal includes only the first serving cell, scheduling, by the network side device, cell handover according to the measurement results of the first serving cell and at least one neighboring cell, and the working status of the auxiliary device.

Optionally, in a scenario in which the terminal is simultaneously in a connection with the plurality of cells, that is, the terminal simultaneously accesses to the plurality of cells, the terminal has a plurality of serving cells in this scenario, where the plurality of serving cells have a primary serving cell and at least one secondary serving cell.

The terminal sends measurement results of the current primary serving cell and the secondary serving cell to the network side device, and the network side device schedules, according to the measurement results of the current primary serving cell and the secondary serving cell of the terminal, a cell handover process performed by the terminal. The working status of the auxiliary device is considered during scheduling.

In a scenario in which the terminal has the plurality of serving cells, in a case that the auxiliary device does not work, the network side device schedules cell handover according to the measurement results of the first serving cell and the measurement result of the at least one second serving cell; and in a case that the auxiliary device works, the network side device schedules cell handover according to the measurement results of the first serving cell and the at least one second serving cell of the terminal in the same beam forwarded by the auxiliary device.

In a scenario in which the terminal does not support simultaneous access to the plurality of cells, the terminal sends the measurement results of the current first serving cell and the neighboring cell to the network side device, and the network side device schedules, according to the measurement results of the current first serving cell and the neighboring cell of the terminal, the cell handover process performed by the terminal. The working status of the auxiliary device needs to be considered for cell handover.

In a scenario in which the terminal has one serving cell, in a case that the auxiliary device does not work, the network side device schedules cell handover according to the measurement results of the first serving cell and the measurement result of the at least one neighboring cell; and in a case that the auxiliary device works, scheduling, by the network side device, cell handover according to measurement results of the first serving cell and the at least one neighboring cell of the terminal in a same beam forwarded by the auxiliary device.

For a scheduling solution in this embodiment, refer to the foregoing embodiments. Details are not described herein again.

In the foregoing implementation, soft cell handover is implemented through primary and secondary serving cell handover, so that continuity of a communication service can be ensured, and communication of the terminal is not affected.

In an embodiment, the scheduling information includes the forwarded beam information of the auxiliary device, the forwarded beam information includes a primary-secondary relationship of the network side device corresponding to a forwarded beam, and step 102 may be implemented in the following manners:

in a case that the serving cell of the terminal includes the first serving cell and the at least one second serving cell, scheduling, by the network side device, primary and secondary serving cell handover according to a position of the terminal and the primary-secondary relationship of the network side device corresponding to the forwarded beam of the auxiliary device, where the primary-secondary relationship of the network side device corresponding to the forwarded beam is determined according to coverage of the forwarded beam of the auxiliary device and a relative position of a network side device corresponding to each serving cell.

Optionally, the forwarded beam information includes at least one of the following: an identifier of each forwarded beam, for example, a port number; a reference signal corresponding to each beam; or information about a serving cell and/or a network side device corresponding to the forwarded beam.

Optionally, the information about the serving cell and/or the network side device corresponding to the forwarded beam may include the primary-secondary relationship of the network side device corresponding to the forwarded beam. Optionally, the primary-secondary relationship of the network side device corresponding to the forwarded beam is determined according to coverage of the forwarded beam of the auxiliary device and a relative position of a network side device corresponding to each serving cell. For example, the forwarded beam is closer to a base station, the base station is used as a primary base station, and another base station is used as a secondary base station.

For example, in FIG. 1, for the beam 1, the primary-secondary relationship of the network side device is that the base station 1 is the primary base station, and the base station 2 is the secondary base station; for the beam 2, the primary-secondary relationship of the network side device is that the base station 1 is the primary base station, and the base station 2 is the secondary base station; and for the beam 3, the primary-secondary relationship of the network side device is that the base station 2 is the primary base station, and the base station 1 is the secondary base station. If the terminal is within coverage of the beam 1, the base station 1 is used as the primary base station, and the base station 2 is used as the secondary base station. If the current first serving cell is a cell within coverage of the base station 1, the second serving cell may be a cell within coverage of the base station 2. If the terminal is within coverage of the beam 3, the base station 2 is used as the primary base station and the base station 1 is used as the secondary base station, and in this case, primary and secondary serving cell handover needs to be performed, the current first serving cell is handed over to the secondary serving cell, and one cell in the second serving cell is handed over to the primary serving cell, for example, a cell with best signal quality in the second serving cell is used as the primary serving cell. In this way, the network side device schedules primary and secondary serving cell handover according to a position change of the terminal and the primary-secondary relationship of the network side device corresponding to the forwarded beam. For example, the terminal moves from the coverage of the beam 1 to the coverage of the beam 3, and the primary-secondary relationship of the network side device changes, and in this case, primary and secondary serving cell handover needs to be performed.

Optionally, when the terminal is handed over from coverage of one forwarded beam of the auxiliary device to coverage of another forwarded beam, beams corresponding to the first serving cell and the first cell are simultaneously handed over.

In the foregoing implementation, when the terminal has a plurality of serving cells, the network side device schedules primary and secondary serving cell handover according to the position of the terminal and the primary-secondary relationship of the network side device corresponding to the forwarded beam of the auxiliary device, which has a simple implementation process and high efficiency.

In an embodiment, the network side device determines, according to the first information, that the terminal needs to be handed over from the current first serving cell to the second cell; or the current first serving cell is handed over to the secondary serving cell, and the second cell is handed over to the primary serving cell. The method further includes the following steps:

The network side device sends a handover indication message to the terminal, where the handover indication message is used for indicating to hand over from the first serving cell to the second cell or perform primary and secondary serving cell handover, and the handover indication message indicates configuration information of the second cell. The configuration information includes at least one of the following: configuration information of a synchronization signal block (SSB) of the second cell, system information (for example, a system information block (SIB)) of the second cell, and configuration information of a physical downlink control channel (PDCCH) of the second cell. The configuration information of the PDCCH includes at least one of the following: a sending period of the PDCCH, time-frequency resource configuration information of the PDCCH, or a use beam of the PDCCH.

Optionally, after the network side device determines that cell handover needs to be performed on the terminal, the network side device sends a handover indication to the terminal. The handover indication is used to indicate to hand over from the first serving cell to the second cell or perform primary and secondary serving cell handover, that is, hand over the current first serving cell to the secondary serving cell and hand over the second cell to the primary serving cell.

The handover indication message further includes information about a target cell to which handover is performed, for example, necessary configuration parameters for receiving broadcast information of the second cell such as sending periods, time-frequency resource configuration information, and use beams of the SSB, the SIB, and the PDCCH of the second cell.

Optionally, an effective time of the configuration information included in the handover indication message may be explicitly indicated in the handover indication message, or take effect at a fixed time after the handover indication message is received according to a rule defined in the protocol.

Optionally, the network side device may further receive a handover request from the terminal. The handover request is sent after the terminal obtains the measurement results of the first serving cell and the at least one first cell, that is, the terminal determines whether to perform cell handover. A process of determining, by the terminal, whether to perform cell handover is similar to an execution process of the network side device. Details are not described herein again.

In an embodiment, before step 102, the method further includes the following steps:

determining, by the network side device, that the terminal is within coverage of the auxiliary device according to a measurement result of a forwarded beam of the auxiliary device and a measurement result of a beam directly sent by the network side device.

Optionally, the network side device configures different listening beams for the terminal, including a beam directly sent by the network side device and a beam forwarded by the auxiliary device. The terminal measures the plurality of listening beams and reports a measurement result, and the network side device determines, according to the reported measurement result, whether the terminal enter the coverage of the auxiliary device, that is, whether the terminal uses the forwarded beam of the auxiliary device to perform communication.

Optionally, different listening beams are embodied as different reference signals and are configured as different port numbers, time-frequency resources, and pseudo-random sequences.

When the terminal performs communication by using the forwarded beam of the auxiliary device, a network side device corresponding to the current first serving cell configures a serving cell of the auxiliary device and/or a corresponding network side device and related configuration information for the terminal. The configuration information includes at least one of the following information: a quantity of serving cells sharing the auxiliary device, a physical cell identifier PCI, a usage time of the auxiliary device, a usage period of using the auxiliary device by each serving cell, or a time-frequency domain configuration parameter of a reference signal (an SSB or a channel state information reference signal (CSI-RS)) of each serving cell. If the reference signal is the CSI-RS, a parameter of a generation sequence of the CSI-RS further needs to be configured.

Since the auxiliary device is introduced, a boundary region of two cells is changed from a region determined based on signal quality of a single beam sent by base stations of two original cells (for example, determined based on RSRP, |RSRP_1-RSRP_2|>Thred, where RSRP1 represents signal quality of the base station 1, RSRP2 represents signal quality of the base station 2, and Thred is a cell handover threshold configured for a network. In the cell boundary region, signal quality of a cell depends on signal quality of a beam that is of the cell and that points to the cell boundary region. Cell handover is performed only when a trigger condition is met, or otherwise, the original cells are camped) to a region determined based on signal quality of a plurality of beams (including a beam of the base station directly pointing to the region and a beam forwarded by the auxiliary device), and an original cell handover condition is difficult to be triggered. In this case, terminals of a plurality of cells simultaneously exist within the coverage of the auxiliary device, and as a result, a cell boundary is blurred, and a transition region between two cells increases, causing an increase in terminals that are interfered by signals from neighboring cells. Therefore, in an embodiment, the terminal may simultaneously access to a plurality of cells, that is, the terminal has a plurality of serving cells. In this scenario, the method further includes:

receiving, by the network side device, measurement results that are sent by the terminal and that are of the first serving cell and at least one third cell in the same beam forwarded by the auxiliary device; and configuring, by the network side device according to the measurement results, an access parameter of the at least one third cell for the terminal.

Optionally, the access parameter is used for indicating data parameter of a PDSCH and a PUSCH of the first cell, including a configuration parameter related to a DL/UL BWP, and configuration parameters related to a PDCCH and a PUCCH of the first cell.

Optionally, the network side device determines, according to the measurement result of the terminal, whether the terminal establishes a connection with at least one third cell, or determines, according to the scheduling information of the network side device, whether the terminal establishes a connection with at least one third cell.

For the solution in which determining is performed based on the measurement result of the terminal, a signal measurement operation on the at least one third cell may be initiated by the network side device or may be triggered by the terminal according to an event. The network side device of the current first serving cell configures a measurement parameter of another cell for the terminal, including at least one of the following: a reference signal (which may be a CSI-RS or an SSB and indicates an SSB index), a measurement period, a measurement window, or a quantity of measurements. It may be understood that, the measured reference signal is a beam that is sent by the network side device to the auxiliary device and forwarded by the auxiliary device. A same SSB of other cells configures a plurality of measurement window corresponding to a plurality of forwarded beams of the auxiliary device. Optionally, a measurement window of a reference signal of another cell in which the auxiliary device does not forward a signal of the another cell or the auxiliary device does not work.

In a scenario in which the network side device performs scheduling, the terminal reports measurement results that are of signals of a plurality of cells in a same beam and that are forwarded by the auxiliary device, and a current network side device configures, according to the measurement results, access parameters (for example, a preamble sequence and a random access channel occasion (RO) resource of contention free random access (CFRA)) of the another cell for the terminal.

Optionally, in a scenario triggered by the terminal, the method further includes:

receiving, by the network side device, a connection establishment request sent by the terminal, where the connection establishment request is used for requesting to establish a connection with at least one third cell; and the connection establishment request is triggered in a case that a first condition is met, and the first condition includes that a difference between a measurement result of the third cell in the same beam forwarded by the auxiliary device and the measurement result of the first serving cell in the same beam forwarded by the auxiliary device is less than or equal to a third threshold; and configuring, by the network side device according to the connection establishment request, an access parameter of the at least one third cell for the terminal.

Optionally, when determining that the measurement results meet the first condition, the terminal triggers to send the connection establishment request to the network side device, where the connection establishment request is used for requesting to establish a connection with the third cell.

The first condition includes that a difference between a measurement result of the third cell in the same beam forwarded by the auxiliary device and the measurement result of the first serving cell in the same beam forwarded by the auxiliary device is less than or equal to a third threshold, and may be represented by the following formula:

abs(Ms−Mn)<Thresh, where Ms represents a measurement result of the current first serving cell in a forwarded beam of the auxiliary device, Mn represents a measurement result of the first cell in a same beam of the auxiliary device, and Thresh represents a third threshold configured by the first serving cell.

The network side device configures, according to the connection establishment request, an access parameter of the first cell for the terminal. For details, refer to the scenario in which the network side device performs scheduling.

Optionally, an additional constraint condition may be added based on the first condition, and the first condition may include one of the following that:

the measurement result of the third cell in the same beam forwarded by the auxiliary device is greater than or equal to a fourth threshold;

a difference between the measurement result of the third cell in the same beam forwarded by the auxiliary device and a measurement result of the third cell in a second condition is greater than a fifth threshold;

the measurement result of the third cell in the second condition is greater than or equal to a sixth threshold; and a time difference of arrival between a downlink frame boundary of the third cell and a downlink frame boundary of the first serving cell is less than or equal to a seventh threshold, where the second condition includes that the auxiliary device does not work or a beam forwarded by the auxiliary device does not point to the terminal.

Optionally, the measurement result of the third cell in the same beam forwarded by the auxiliary device is greater than a fourth threshold, which may be represented as follows: Mn>Thresh1, where Thresh1 represents the fourth threshold configured by the first serving cell;

a difference between the measurement result of the third cell in the same beam forwarded by the auxiliary device and a measurement result of the third cell in a second condition is greater than a fifth threshold, which may be represented as follows: Mn−Mn0>Thresh2, where Mn0 is the measurement result of the third cell when the auxiliary device does not work or the forwarded beam of the auxiliary device does not point to the terminal, and Thresh2 represents the fifth threshold configured by the first serving cell; and the measurement result of the third cell in the second condition is greater than or equal to a sixth threshold, which may be represented as follows: Mn0>Thresh3, where Thresh3 represents the sixth threshold configured by the first serving cell.

Optionally, the terminal determines a time difference of arrival between downlink frame boundaries of the current first serving cell and the third cell (that is, a synchronous situation of downlink frame boundaries of different cells), when the time difference of arrival between the downlink frame boundaries is less than the seventh threshold Thresh4, a connection is allowed to be established between the terminal and the third cell. Optionally, the terminal receives an SSB of the third cell and performs a random access procedure, so that the terminal is connected to the third cell, and uplink and downlink synchronization is achieved.

Optionally, after the terminal accesses to the at least one third cell, the third cell becomes the first cell.

For the solution in which determining is performed according to the scheduling information of the network side device, optionally, the network side device sends scheduling signaling to the terminal, the terminal is scheduled to perform random access on the first cell, and a RO resource of Msg1 and a parameter of a preamble of CF RA that are for random access, and uplink and downlink band width parts of the first cell for communication are configured in the scheduling signaling.

In the foregoing implementation, since the terminal accesses to a plurality of cells, a signal of another cell also provides a service for the terminal and may not become an interference signal, which reduces inter-cell interference.

Optionally, in an embodiment, the method further includes:

sending, by the network side device, TA to the terminal, the TA being used by the terminal to perform communication on the first serving cell and each first cell.

Optionally, the network side device of the current first serving cell sends the TA to the terminal, when the terminal accesses to both the current first serving cell and another second serving cell, the terminal receives only the TA of the current first serving cell, and acts on both the current first serving cell and the another second serving cell, that is, the TA is also applicable to the another second serving cell.

In an embodiment, the terminal may leave the coverage of the auxiliary device during movement. If the terminal leaves the coverage of the auxiliary device, the terminal is switched to a state in which the terminal directly communicates with the network side device, that is, the method further includes:

receiving, by the network side device, indication information sent by the terminal, the indication information being used for indicating that the terminal directly communicates with the network side device; and sending, by the network side device, a notification message to a network side device of each first cell, the notification message being used for indicating to disconnect from the terminal.

Optionally, the terminal obtains a measurement result of a measurement beam according to the measurement beam configured by the current first serving cell. The measurement beam includes a beam directly sent by the network side device and a beam that is sent by the network side device and forwarded by the auxiliary device. If the terminal has performed primary and secondary serving cell handover within the coverage of the auxiliary device, the current first serving cell needs to re-configure a measurement beam for the terminal.

When a measurement result of the beam directly sent by the network side device is superior to a measurement result of the forwarded beam of the auxiliary device, the terminal switches to a state in which the terminal directly communicates with the network side device. In addition, the terminal no longer maintains a connection with another serving cell, and the network side device corresponding to the current first serving cell notifies the another serving cell to disconnect a communication connection with the terminal.

In the foregoing implementation, after the terminal leaves the coverage of the auxiliary device during movement, the terminal switches to the state in which the terminal directly communicates with the network side device, and there is no need to perform forwarding through the auxiliary device, which improves communication efficiency.

Figure 6:
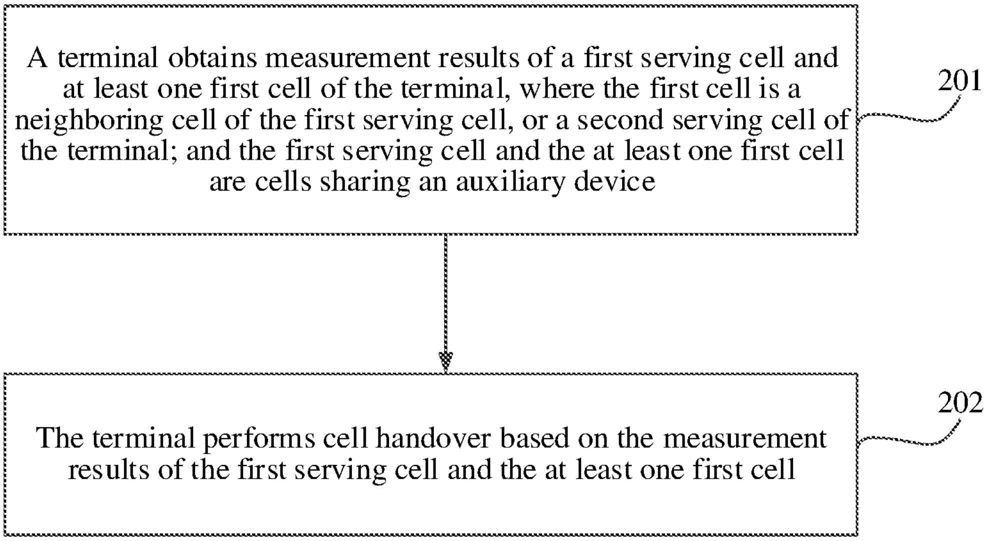
FIG. 6 is a second schematic flowchart of a cell handover method according to an embodiment of this application.

In an embodiment, as shown in FIG. 6, the cell handover method provided in the embodiments includes the following steps:

Step 201: The terminal obtains measurement results of a first serving cell and at least one first cell of the terminal.

The first cell is a neighboring cell of the first serving cell, or a second serving cell of the terminal; and the first serving cell and the at least one first cell are cells sharing an auxiliary device.

For an implementation principle of this step, refer to the description of step 101. Details are not described herein again.

Step 202: The terminal performs cell handover based on the measurement results of the first serving cell and the at least one first cell.

Optionally, the terminal may directly determine, according to the measurement results, whether to perform cell handover. If the terminal determines to perform cell handover, the terminal may send a handover request to the network side device.

Alternatively, the terminal may send the measurement results to the network side device, and the network side device determines whether to perform cell handover. If the network side device determines to perform cell handover, the network side device sends a handover indication to the terminal.

Optionally, step 202 may be implemented in the following manners:

A manner includes the following steps:

sending, by the terminal, the measurement results of the first serving cell and the at least one first cell to a network side device, the measurement results being used by the network side device to schedule cell handover; and performing, by the terminal, cell handover according to a handover indication message sent by the network side device.

Another manner includes the following steps:

determining, by the terminal according to the measurement results of the first serving cell and the at least one first cell, to perform cell handover; and performing, by the terminal, cell handover according to a handover indication message sent by the network side device, the handover indication message being sent by the network side device according to a handover request sent by the terminal.

Optionally, after the determining, by the terminal according to the measurement results of the first serving cell and the at least one first cell, to perform cell handover, the method further includes:

sending, by the terminal, the handover request to the network side device.

Optionally, the determining, by the terminal according to the measurement results of the first serving cell and the at least one first cell, to perform cell handover may be implemented in the following manners:

determining, by the terminal according to the measurement results of the first serving cell and the at least one first cell, and a working status of the auxiliary device, to perform cell handover.

Optionally, in a case that the auxiliary device does not work, determining, by the terminal according to the measurement result of the first serving cell and the measurement result of the at least one first cell, to perform cell handover; and in a case that the auxiliary device works, determining, by the terminal according to measurement results of the first serving cell and the at least one first cell of the terminal in a same beam forwarded by the auxiliary device, to perform cell handover.

Optionally, in a case that a difference between a measurement result of a second cell and the measurement result of the first serving cell is greater than a first threshold, determining, by the terminal, to perform cell handover; and in a case that a difference between the measurement result of the second cell and a measurement result of the first serving cell in a same beam forwarded by the auxiliary device is greater than a second threshold, determining, by the terminal, to perform cell handover, where the second cell is any cell in the at least one first cell.

In an embodiment, the determining, by the terminal according to the measurement results of the first serving cell and the at least one first cell, to perform cell handover may be implemented in the following manners:

in a case that a serving cell of the terminal includes the first serving cell and at least one second serving cell, determining, by the terminal according to the measurement results of the first serving cell and the at least one second serving cell, and the working status of the auxiliary device, to perform primary and secondary serving cell handover; or in a case that a serving cell of the terminal includes the first serving cell, determining, by the terminal according to the measurement results of the first serving cell and at least one neighboring cell, and the working status of the auxiliary device, to perform cell handover.

Optionally, the terminal sends a connection establishment request to the network side device, where the connection establishment request is used for requesting to establish a connection with at least one third cell; and the connection establishment request is triggered in a case that a first condition is met, and the first condition includes that a difference between a measurement result of the third cell in the same beam forwarded by the auxiliary device and the measurement result of the first serving cell in the same beam forwarded by the auxiliary device is less than or equal to a third threshold; and the terminal receives an access parameter of the at least one third cell sent by the network side device.

Optionally, the obtaining, by a terminal, measurement results of a first serving cell and at least one first cell of the terminal includes:

obtaining, by the terminal, the measurement results of the first serving cell and the at least one first cell according to measurement configuration information, and sending the measurement results of the first serving cell and the at least one first cell to the network side device, where the measurement configuration information includes at least one of the following: a reference signal, a measurement period, a measurement time window, or a quantity of measurements.

Optionally, the method further includes:

obtaining, by the terminal, a measurement result of a beam directly sent by the network side device and a measurement result of a forwarded beam of the auxiliary device; and switching, by the terminal according to the measurement result of the beam directly sent by the network side device and the measurement result in the forwarded beam of the auxiliary device, to directly communicate with the network side device.

Optionally, after the switching to directly communicate with the network side device, the method further includes:

disconnecting, by the terminal, from the second serving cell.

An implementation process and a technical effect of the foregoing implementation is similar to those of the method embodiment of a network side, which may refer to the detailed descriptions in the embodiment of the network side. Details are not described herein again.

Figure 7:
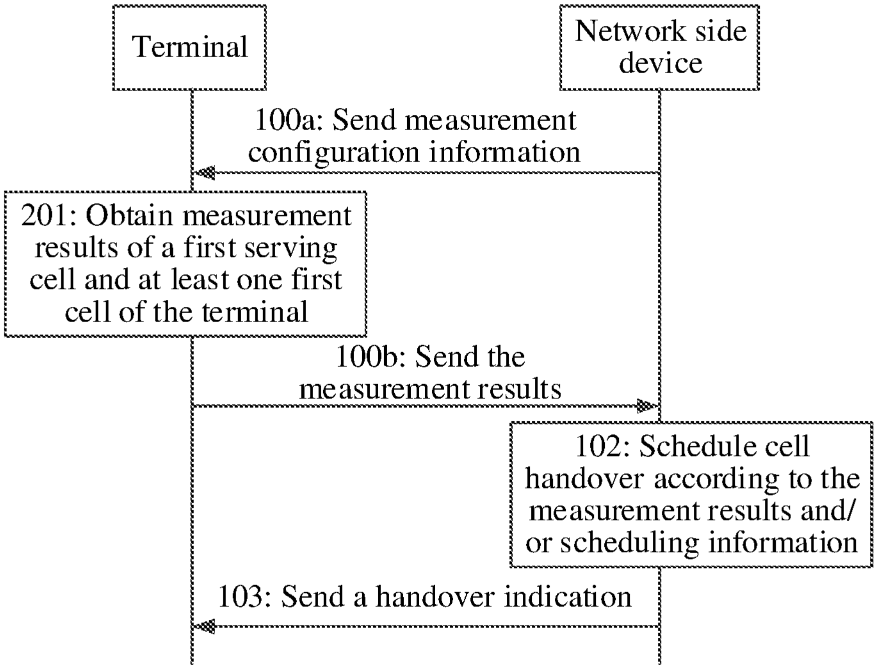
FIG. 7 is a first schematic interaction flowchart of a cell handover method according to an embodiment of this application.

As shown in FIG. 7, the method includes:

Step 100*a*: The network side device sends measurement configuration information to the terminal.

Step 201: The terminal obtains measurement results of a first serving cell and at least one first cell of the terminal.

Step 100*b*: The terminal sends, to a network side device, the measurement results of the first serving cell and the at least one first cell of the terminal.

Step 102: The network side device schedules cell handover according to the measurement results and/or scheduling information.

Step 103: The network side device sends a handover indication to the terminal.

Figure 8:
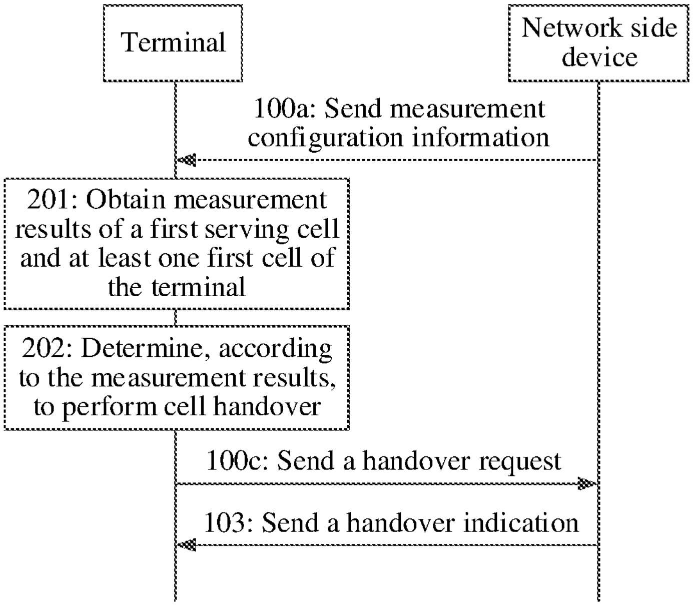
FIG. 8 is a second schematic interaction flowchart of a cell handover method according to an embodiment of this application.

As shown in FIG. 8, the method includes:

Step 100*a*: The network side device sends measurement configuration information to the terminal.

Step 201: The terminal obtains measurement results of a first serving cell and at least one first cell of the terminal.

Step 202: The terminal determines, according to the measurement results of the first serving cell and the at least one first cell of the terminal, to perform cell handover.

Step 100*c*: The terminal sends a handover request to the network side device.

Step 103: The network side device sends a handover indication to the terminal.

Figure 9:
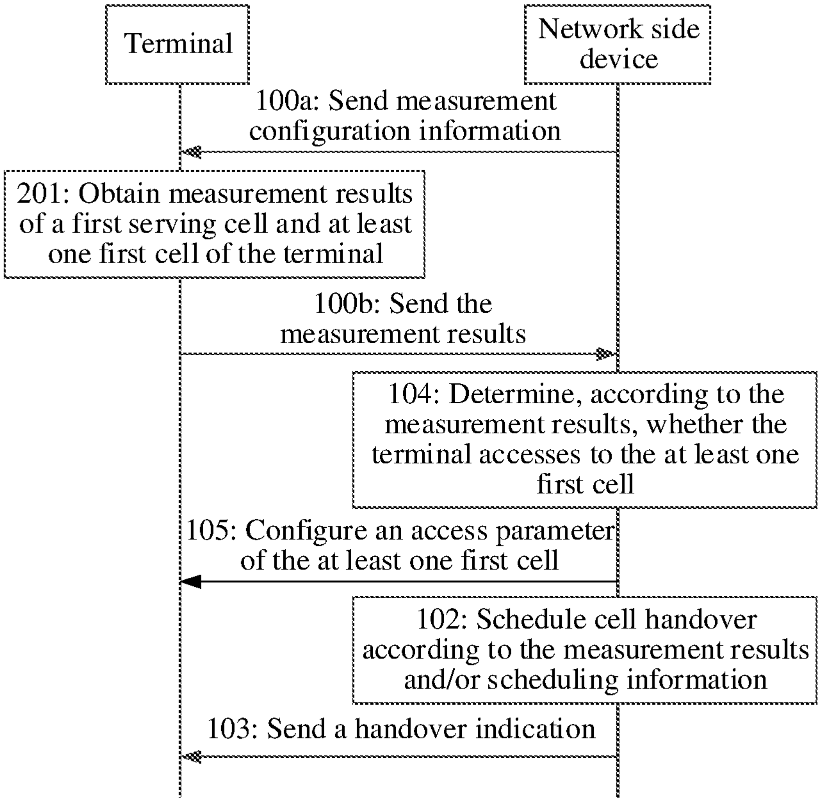
FIG. 9 is a third schematic interaction flowchart of a cell handover method according to an embodiment of this application.

Optionally, as shown in FIG. 9, after step 100*b*, the method may further include the following steps:

Step 104: The network side device determines, according to the measurement results, whether the terminal accesses to the at least one first cell.

If yes, step 105 is performed, including: configuring an access parameter of the at least one first cell.

Figure 10:
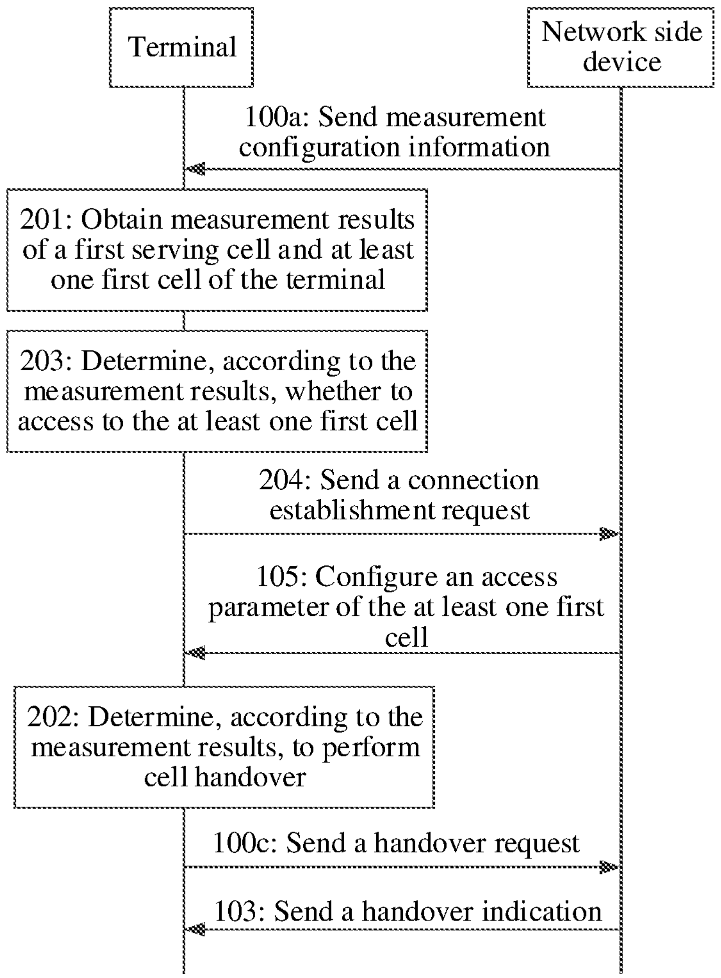
FIG. 10 is a fourth schematic interaction flowchart of a cell handover method according to an embodiment of this application.

Optionally, as shown in FIG. 10, after step 201, the method further includes the following steps:

Step 203: The terminal determines, according to the measurement results, whether to access to the at least one first cell.

Step 204: The terminal sends a connection establishment request to the network side device.

Step 105: Configure an access parameter of the at least one first cell.

It is to be noted that, an execution entity of the cell handover method provided in the embodiments of this application may be a cell handover apparatus, or may be a processing module in the cell handover apparatus for performing the cell handover method. The cell handover apparatus provided in the embodiments of this application is described in the embodiments of this application by using an example in which the cell handover apparatus performs the cell handover method.

Figure 11:
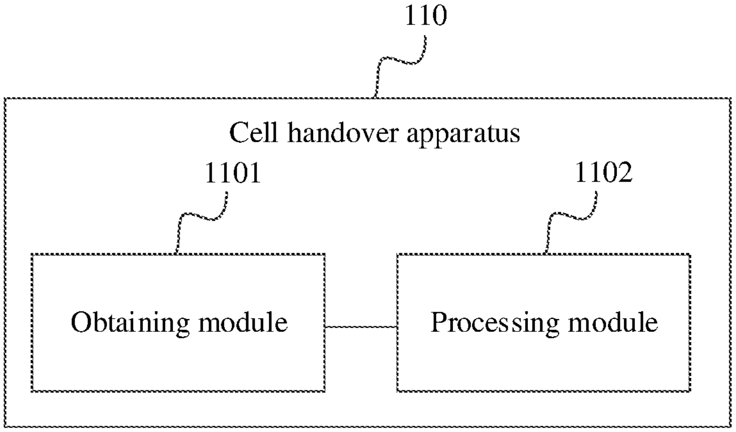
FIG. 11 is a first schematic structural diagram of a cell handover apparatus according to an embodiment of this application.

FIG. 11 is a first schematic structural diagram of a cell handover apparatus according to this application. As shown in FIG. 11, a cell handover apparatus 110 provided in this embodiment includes:

an obtaining module 1101, configured to obtain first information; and a processing module 1102, configured to schedule cell handover according to the first information, where the first information includes at least one of the following: measurement results of a first serving cell and at least one first cell, or scheduling information; the first cell is a neighboring cell of the first serving cell, or a second serving cell of the terminal; and the first serving cell and the at least one first cell are cells sharing an auxiliary device.

In this embodiment, the processing module may schedule cell handover based on measurement results of a plurality of cells and/or scheduling information. The plurality of cells share the auxiliary device. The plurality of cells include the first serving cell and the at least one first cell of the terminal. The first cell may be a neighboring cell of the first serving cell, or may be a second serving cell of the terminal. A solution for the terminal to perform cell handover in a communication scenario in which there is an auxiliary device is implemented by using the measurement results of the cells and/or the scheduling information.

Optionally, in a case that the first information includes the measurement results of the first serving cell and the at least one first cell of the terminal, the processing module 1102 is configured to:

schedule cell handover according to the measurement results of the first serving cell and the at least one first cell, and a working status of the auxiliary device.

Optionally, the processing module 1102 is configured to:

in a case that the auxiliary device does not work, schedule cell handover according to the measurement result of the first serving cell and the measurement result of the at least one first cell; and in a case that the auxiliary device works, schedule cell handover according to measurement results of the first serving cell and the at least one first cell of the terminal in a same beam forwarded by the auxiliary device.

Optionally, the processing module 1102 is configured to:

schedule cell handover in a case that a difference between a measurement result of a second cell and the measurement result of the first serving cell is greater than a first threshold; and schedule cell handover in a case that a difference between measurement results of the second cell and the first serving cell in the same beam forwarded by the auxiliary device is greater than a second threshold, where the second cell is any cell in the at least one first cell.

Optionally, the processing module 1102 is configured to:

in a case that a serving cell of the terminal includes the first serving cell and at least one second serving cell, schedule primary and secondary serving cell handover according to the measurement results of the first serving cell and the at least one second serving cell, and the working status of the auxiliary device; or in a case that a serving cell of the terminal includes the first serving cell, schedule cell handover according to the measurement results of the first serving cell and at least one neighboring cell, and the working status of the auxiliary device.

Optionally, the scheduling information includes at least one of the following: a quantity of terminals within coverage of the auxiliary device, service information of the terminal, or forwarded beam information of the auxiliary device.

Optionally, the scheduling information includes the forwarded beam information of the auxiliary device, the forwarded beam information includes a primary-secondary relationship of the network side device corresponding to a forwarded beam, and the processing module 1102 is configured to:

in a case that the serving cell of the terminal includes the first serving cell and the at least one second serving cell, schedule primary and secondary serving cell handover according to a position of the terminal and the primary-secondary relationship of the network side device corresponding to the forwarded beam of the auxiliary device, where the primary-secondary relationship corresponding to the forwarded beam is determined according to coverage of the forwarded beam of the auxiliary device and a relative position of a network side device corresponding to each serving cell.

Optionally, the cell handover apparatus further includes:

a sending module, configured to send a handover indication message to the terminal, where the handover indication message is used for indicating to hand over from the first serving cell to the second cell or perform primary and secondary serving cell handover, and indicating configuration information of the second cell, the configuration information of the second cell including at least one of the following: configuration information of a synchronization signal block SSB of the second cell, system information of the second cell, or configuration information of a physical downlink control channel PDCCH of the second cell.

Optionally, the processing module 1102 is further configured to:

determine that the terminal is within coverage of the auxiliary device according to a measurement result of a forwarded beam of the auxiliary device and a measurement result of a beam directly sent by the network side device.

Optionally, the sending module is further configured to send configuration information of the auxiliary device to the terminal, where the configuration information of the auxiliary device includes at least one of the following: a quantity of cells sharing the auxiliary device, a physical cell identifier PCI, a usage time of the auxiliary device, a usage period of the auxiliary device, or a time-frequency domain configuration parameter of a reference signal.

Optionally, the obtaining module 1101 is further configured to:

receive measurement results that are sent by the terminal and that are of the first serving cell and at least one third cell in the same beam forwarded by the auxiliary device; and the processing module 1102 is further configured to:

configure, according to the measurement results, an access parameter of the at least one third cell for the terminal.

Optionally, the obtaining module 1101 is further configured to:

receive a connection establishment request sent by the terminal, where the connection establishment request is used for requesting to establish a connection with at least one third cell; and the connection establishment request is triggered in a case that a first condition is met, and the first condition includes that a difference between a measurement result of the third cell in the same beam forwarded by the auxiliary device and the measurement result of the first serving cell in the same beam forwarded by the auxiliary device is less than or equal to a third threshold; and the processing module 1102 is further configured to:

configure, according to the connection establishment request, an access parameter of the at least one third cell for the terminal.

Optionally, the first condition further includes at least one of the following that:

the measurement result of the third cell in the same beam forwarded by the auxiliary device is greater than or equal to a fourth threshold;

a difference between the measurement result of the third cell in the same beam forwarded by the auxiliary device and a measurement result of the third cell in a second condition is greater than a fifth threshold;

the measurement result of the third cell in the second condition is greater than or equal to a sixth threshold; or a time difference of arrival between a downlink frame boundary of the third cell and a downlink frame boundary of the first serving cell is less than or equal to a seventh threshold, where the second condition includes that the auxiliary device does not work or a beam forwarded by the auxiliary device does not point to the terminal.

Optionally, the sending module is further configured to:

send measurement configuration information of each first cell to the terminal, the measurement configuration information including at least one of the following: a reference signal, a measurement period, a measurement time window, and a quantity of measurements.

Optionally, the sending module is further configured to:

send timing advance TA to the terminal, the TA being used by the terminal to perform communication on the first serving cell and each first cell.

Optionally, the obtaining module 1101 is further configured to:

receive indication information sent by the terminal, the indication information being used for indicating that the terminal directly communicates with the network side device; and the sending module is further configured to:

send a notification message to a network side device of each first cell, the notification message being used for indicating to disconnect from the terminal.

The apparatus in this embodiment may be configured to perform the method of any embodiment in the method embodiments of a network side. An implementation process and a technical effect of the foregoing implementation is similar to those of the method embodiment of the network side, which may refer to the detailed descriptions in the method embodiments of the network side. Details are not described herein again.

Figure 12:
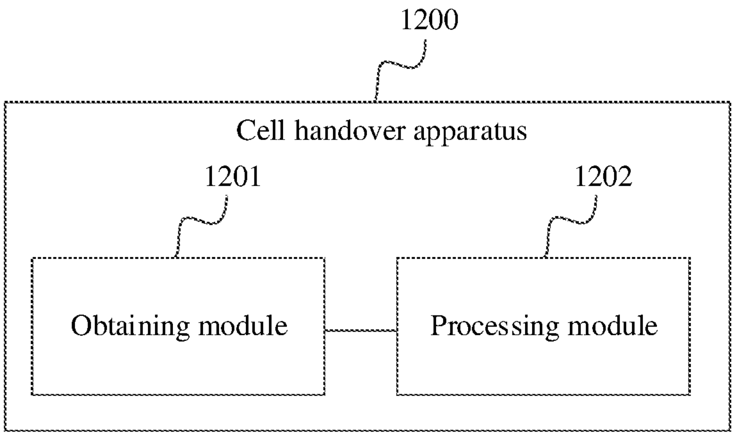
FIG. 12 is a second schematic structural diagram of a cell handover apparatus according to an embodiment of this application.

FIG. 12 is a second schematic structural diagram of a cell handover apparatus according to this application. As shown in FIG. 12, a cell handover apparatus 1200 provided in this embodiment includes:

an obtaining module 1201, configured to obtain measurement results of a first serving cell and at least one first cell of the terminal; and a processing module 1202, configured to perform cell handover based on the measurement results of the first serving cell and the at least one first cell, where the first cell is a neighboring cell of the first serving cell, or a second serving cell of the terminal; and the first serving cell and the at least one first cell are cells sharing an auxiliary device.

In this embodiment, the processing module may perform cell handover based on measurement results of a plurality of cells. The plurality of cells share the auxiliary device. The plurality of cells include the first serving cell and the at least one first cell of the terminal. The first cell may be a neighboring cell of the first serving cell, or may be a second serving cell of the terminal. A solution for the terminal to perform cell handover in a communication scenario in which there is an auxiliary device is implemented by using the measurement results of the cells and/or the scheduling information.

Optionally, the method further includes:

a sending module, configured to send the measurement results of the first serving cell and the at least one first cell to a network side device, the measurement results being used by the network side device to schedule cell handover; and a processing module 1202, configured to perform cell handover according to a handover indication message sent by the network side device.

Optionally, the processing module 1202 is configured to:

determine, according to the measurement results of the first serving cell and the at least one first cell, to perform cell handover; and perform cell handover according to a handover indication message sent by the network side device, the handover indication message being sent by the network side device according to a handover request sent by the terminal.

Optionally, the processing module 1202 is configured to:

determine, according to the measurement results of the first serving cell and the at least one first cell, and a working status of the auxiliary device, to perform cell handover.

Optionally, the processing module 1202 is configured to:

in a case that the auxiliary device does not work, determine, according to the measurement result of the first serving cell and the measurement result of the at least one first cell, to perform cell handover; and in a case that the auxiliary device works, determine, according to measurement results of the first serving cell and the at least one first cell of the terminal in a same beam forwarded by the auxiliary device, to perform cell handover.

Optionally, the processing module 1202 is configured to:

in a case that a difference between a measurement result of a second cell and the measurement result of the first serving cell is greater than a first threshold, determine to perform cell handover; and in a case that a difference between the measurement result of the second cell and a measurement result of the first serving cell in a same beam forwarded by the auxiliary device is greater than a second threshold, determine to perform cell handover, where the second cell is any cell in the at least one first cell.

Optionally, the processing module 1202 is configured to:

in a case that a serving cell of the terminal includes the first serving cell and at least one second serving cell, determine, according to the measurement results of the first serving cell and the at least one second serving cell, and the working status of the auxiliary device, to perform primary and secondary serving cell handover; or in a case that a serving cell of the terminal includes the first serving cell, determine, according to the measurement results of the first serving cell and at least one neighboring cell, and the working status of the auxiliary device, to perform cell handover.

Optionally, the sending module is further configured to:

send a connection establishment request to the network side device, where the connection establishment request is used for requesting to establish a connection with at least one third cell; and the connection establishment request is triggered in a case that a first condition is met, and the first condition includes that a difference between a measurement result of the third cell in the same beam forwarded by the auxiliary device and the measurement result of the first serving cell in the same beam forwarded by the auxiliary device is less than or equal to a third threshold; and the obtaining module 1201 is configured to receive an access parameter of the at least one third cell sent by the network side device.

Optionally, the obtaining module 1201 is configured to:

obtain measurement results of the first serving cell and the at least one first cell according to measurement configuration information; and the sending module is further configured to send the measurement results of the first serving cell and the at least one first cell to the network side device. The measurement configuration information includes at least one of the following: a reference signal, a measurement period, a measurement time window, or a quantity of measurements.

Optionally, the obtaining module 1201 is further configured to:

obtain a measurement result of a beam directly sent by the network side device and a measurement result of a forwarded beam of the auxiliary device; and the processing module 1202 is configured to:

switch, according to the measurement result of the beam directly sent by the network side device and the measurement result in the forwarded beam of the auxiliary device, to directly communicate with the network side device.

Optionally, the processing module 1202 is configured to:

disconnect, by the terminal, from the second serving cell.

The apparatus in this embodiment may be configured to perform the method of any embodiment in the method embodiments of a terminal side. An implementation process and a technical effect of the foregoing implementation is similar to those of the method embodiment of the terminal side, which may refer to the detailed descriptions in the method embodiments of the terminal side. Details are not described herein again.

The cell handover apparatus in the embodiments of this application may be an apparatus, an apparatus or electronic device with an operating system, or may be a component, an integrated circuit, or a chip in the terminal. The apparatus or the electronic device may be a mobile terminal or may be a non-mobile terminal. For example, the mobile terminal may include but is not limited to a type of the terminal 11 listed above, and the non-mobile terminal may be a server, a network attached storage (NAS), a personal computer (PC), a television (TV), a teller machine, a self-service machine, or the like. This is not specifically limited in the embodiments of this application.

The cell handover apparatus provided in the embodiments of this application can implement the processes implemented in the method embodiment of FIG. 5 to FIG. 10 and achieve the same technical effect. To avoid repetition, details are not described herein again.

Figure 13:
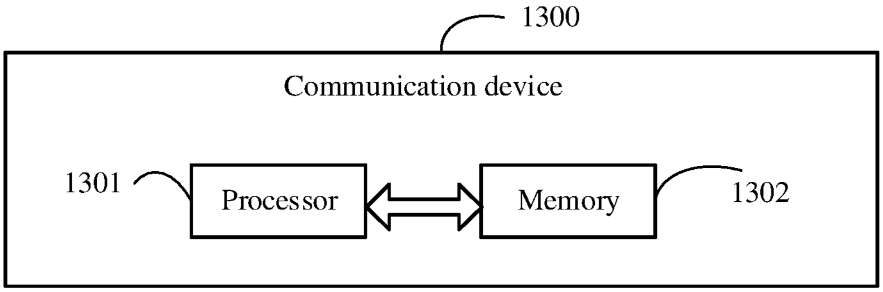
FIG. 13 is a schematic structural diagram of a communication device according to an embodiment of this application.

Optionally, as shown in FIG. 13, an embodiment of this application further provides a communication device 1300, including a processor 1301, a memory 1302, and a program or instructions stored in the memory 1302 and executable on the processor 1301. For example, in a case that the communication device 1300 is a terminal, when the program or instructions is executed by the processor 1301, the processes of the cell handover method are implemented, and the same technical effects can be achieved. In a case that the communication device 1300 is a network side device, when the program or instructions is executed by the processor 1301, the processes of the cell handover method are implemented, and the same technical effects can be achieved. To avoid repetition, details are not described herein again.

Figure 14:
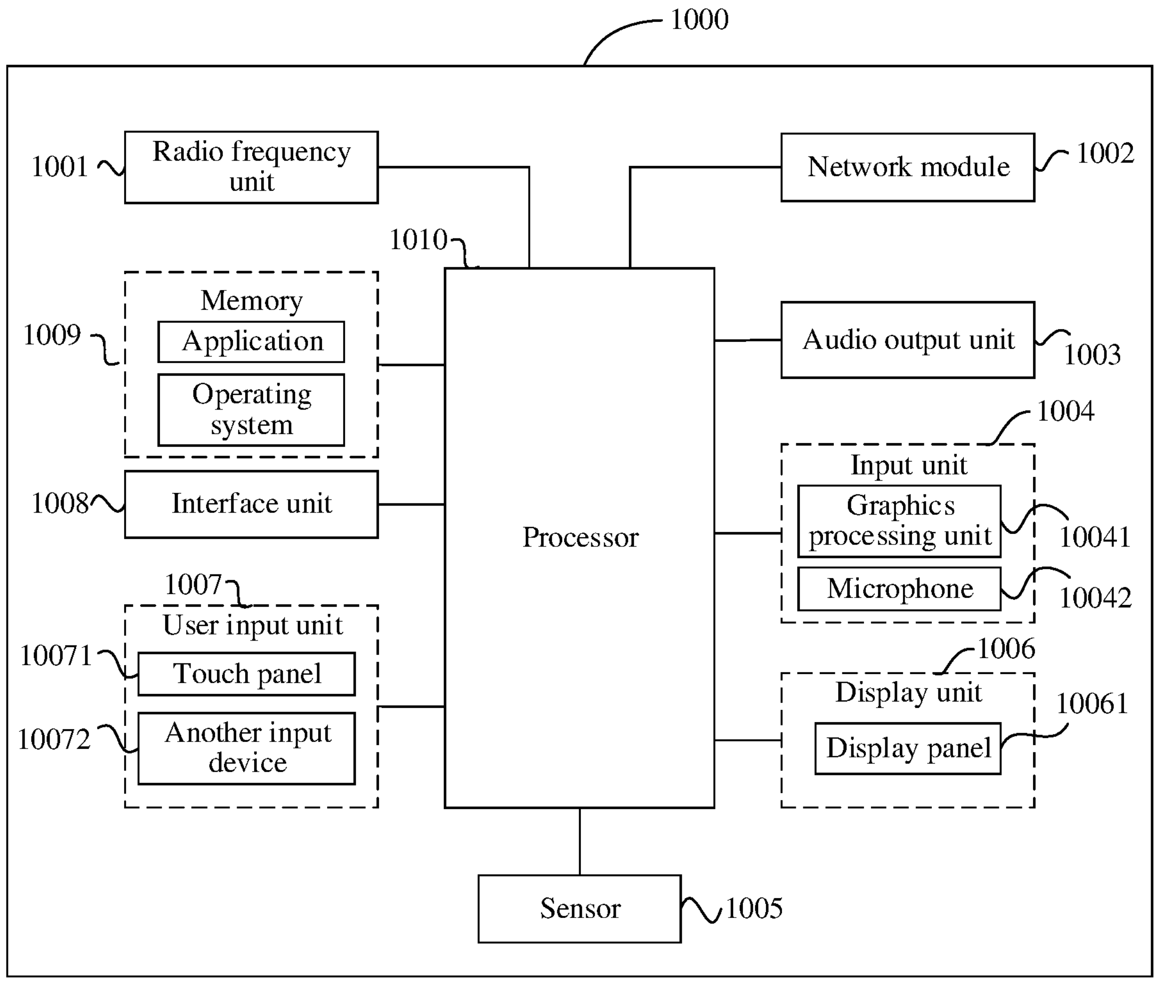
FIG. 14 is a schematic structural diagram of hardware of a terminal according to an embodiment of this application.

An embodiment of this application further provides a terminal, including a processor and a communication interface. The communication interface is configured to obtain measurement results of a first serving cell and at least one first cell of the terminal, and the processor is configured to perform cell handover based on the measurement results of the first serving cell and the at least one first cell, where the first cell is a neighboring cell of the first serving cell, or a second serving cell of the terminal; and the first serving cell and the at least one first cell are cells sharing an auxiliary device. The embodiment of the terminal corresponds to the embodiment of the method of the terminal side. All implementation processes of the method embodiment are applicable to the embodiment of the terminal and can achieve the same technical effects. Optionally, FIG. 14 is a schematic diagram of a hardware structure of a terminal according to an embodiment of this application.

The terminal 1000 includes, but is not limited to, at least some components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

A person skilled in the art may understand that, the terminal 1000 may further include a power supply (such as a battery) for supplying power to the components. The power supply may be logically connected to the processor 1010 by using a power management system, thereby implementing functions such as charging, discharging, and power consumption management by using the power management system. A terminal structure shown in FIG. 14 does not constitute a limitation to the terminal, and the terminal may include more or fewer components than those shown in the figure, or some components may be combined, or a different component deployment may be used. Details are not described herein again.

It may be understood that, in the embodiments of this application, the input unit 1004 may include a graphics processing unit (GPU) 10041 and a microphone 10042. The graphics processing unit 10041 processes image data of a static picture or a video obtained by an image capturing apparatus (for example, a camera) in a video capturing mode or an image capturing mode. The display unit 1006 may include a display panel 10061, for example, a display panel 10061 configured in a form such as a liquid crystal display or an organic light-emitting diode. The user input unit 1007 includes a touch panel 10071 and another input device 10072. The touch panel 10071 is also referred to as a touchscreen. The touch panel 10071 may include two parts: a touch detection apparatus and a touch controller. The another input device 10072 may include, but is not limited to, a physical keyboard, a functional key (such as a volume control key or a switch key), a track ball, a mouse, and a joystick, and the details will not be described herein again.

In this embodiment of this application, the radio frequency unit 1001 receives downlink data from a network side device and sends the data to the processor 1010 for processing; and sends uplink data to the network side device. Generally, the radio frequency unit 1001 includes, but is not limited to, an antenna, at least one amplifier, a transceiver, a coupler, a low noise amplifier, a duplexer, and the like.

The memory 1009 may be configured to store a software program or instructions and various data. The memory 1009 may mainly include a program storage or instruction area and a data storage area. The program storage or instruction area may store an operating system, an application program or instructions required by at least one function (for example, a sound playback function and an image playback function), or the like. In addition, the memory 1009 may include a high speed RAM, and may further include a non-volatile memory. The non-volatile memory may be a read-only memory (ROM), a programmable ROM (PROM), an erasable programmable read-only memory (EPROM), an electrically EPROM (EEPROM), or a flash memory. For example, at least one magnetic disk storage device, a flash memory device, or another non-volatile solid-state storage device.

The processor 1010 may include one or more processing units. Optionally, the processor 1010 may integrate an application processor and a modem processor. The application processor mainly processes an operating system, a user interface, an application program or instructions, and the like. The modem processor mainly processes wireless communication, for example, a baseband processor. It may be understood that the foregoing modem may either not be integrated into the processor 1010.

The processor 1010 is configured to obtain measurement results of a first serving cell and at least one first cell of the terminal; and perform cell handover based on the measurement results of the first serving cell and the at least one first cell, where the first cell is a neighboring cell of the first serving cell, or a second serving cell of the terminal; and the first serving cell and the at least one first cell are cells sharing an auxiliary device.

In this embodiment, the processing module may perform cell handover based on measurement results of a plurality of cells. The plurality of cells share the auxiliary device. The plurality of cells include the first serving cell and the at least one first cell of the terminal. The first cell may be a neighboring cell of the first serving cell, or may be a second serving cell of the terminal. A solution for the terminal to perform cell handover in a communication scenario in which there is an auxiliary device is implemented by using the measurement results of the cells and/or the scheduling information.

Optionally, the radio frequency unit 1001 is configured to:

send the measurement results of the first serving cell and the at least one first cell to a network side device, the measurement results being used by the network side device to schedule cell handover; and the processor 1010 is configured to perform cell handover according to a handover indication message sent by the network side device.

In the foregoing implementation, the network side device may schedule cell handover based on measurement results of a plurality of cells. The plurality of cells share the auxiliary device. The plurality of cells include the first serving cell and the at least one first cell of the terminal. The first cell may be a neighboring cell of the first serving cell, or may be a second serving cell of the terminal. A solution for the terminal to perform cell handover in a communication scenario in which there is an auxiliary device is implemented by using the measurement results of the cells and/or the scheduling information.

Optionally, the processor 1010 is configured to:

determine, according to the measurement results of the first serving cell and the at least one first cell, to perform cell handover; and perform cell handover according to a handover indication message sent by the network side device, the handover indication message being sent by the network side device according to a handover request sent by the terminal.

In the foregoing implementation, the network side device may determine, based on the measurement results of the plurality of cells, whether to perform cell handover, to further interact with the network side device to schedule cell handover. The plurality of cells share the auxiliary device. The plurality of cells include the first serving cell and the at least one first cell of the terminal. The first cell may be a neighboring cell of the first serving cell, or may be a second serving cell of the terminal. A solution for the terminal to perform cell handover in a communication scenario in which there is an auxiliary device is implemented by using the measurement results of the cells and/or the scheduling information.

Optionally, the processor 1010 is configured to:

determine, according to the measurement results of the first serving cell and the at least one first cell, and a working status of the auxiliary device, to perform cell handover.

Optionally, the processor 1010 is configured to:

in a case that the auxiliary device does not work, determine, according to the measurement result of the first serving cell and the measurement result of the at least one first cell, to perform cell handover; and in a case that the auxiliary device works, determine, according to measurement results of the first serving cell and the at least one first cell of the terminal in a same beam forwarded by the auxiliary device, to perform cell handover.

Optionally, the processor 1010 is configured to:

in a case that a difference between a measurement result of a second cell and the measurement result of the first serving cell is greater than a first threshold, determine to perform cell handover; and in a case that a difference between the measurement result of the second cell and a measurement result of the first serving cell in a same beam forwarded by the RIS device is greater than a second threshold, determine to perform cell handover, where the second cell is any cell in the at least one first cell.

In the foregoing implementation, since the signals of the cells are affected by the forwarded beam of the auxiliary device, the working status of the auxiliary device affects the measurement results of the cells. Cell handover is performed according to the measurement results of the cells and the working status of the auxiliary device, which makes a decision for cell handover more accurate.

Optionally, the processor 1010 is configured to:

in a case that a serving cell of the terminal includes the first serving cell and at least one second serving cell, determine, according to the measurement results of the first serving cell and the at least one second serving cell, and the working status of the auxiliary device, to perform primary and secondary serving cell handover; or in a case that a serving cell of the terminal includes the first serving cell, determine, according to the measurement results of the first serving cell and at least one neighboring cell, and the working status of the auxiliary device, to perform cell handover.

In the foregoing implementation, soft cell handover is implemented through primary and secondary serving cell handover, so that continuity of a communication service can be ensured, and communication of the terminal is not affected.

Optionally, the radio frequency unit 1001 is further configured to:

send a connection establishment request to the network side device, where the connection establishment request is used for requesting to establish a connection with at least one third cell; and the connection establishment request is triggered in a case that a first condition is met, and the first condition includes that a difference between a measurement result of the third cell in a same beam forwarded by the RIS device and a measurement result of the first serving cell in the same beam forwarded by the RIS device is less than or equal to a third threshold; and receive an access parameter of the at least one third cell sent by the network side device.

In the foregoing implementation, since the terminal accesses to a plurality of cells, a signal of another cell also provides a service for the terminal and may not become an interference signal, which reduces inter-cell interference.

Optionally, the processor 1010 is configured to:

obtain measurement results of the first serving cell and the at least one first cell according to measurement configuration information; and the radio frequency unit 1001 is configured to send the measurement results of the first serving cell and the at least one first cell to the network side device. The measurement configuration information includes at least one of the following: a reference signal, a measurement period, a measurement time window, or a quantity of measurements.

Optionally, the processor 1010 is further configured to:

obtain a measurement result of a beam directly sent by the network side device and a measurement result of a forwarded beam of the auxiliary device; and switch, according to the measurement result of the beam directly sent by the network side device and the measurement result in the forwarded beam of the auxiliary device, to directly communicate with the network side device.

Optionally, the processor 1010 is configured to:

disconnect, by the terminal, from the second serving cell.

In the foregoing implementation, after the terminal leaves the coverage of the auxiliary device during movement, the terminal switches to the state in which the terminal directly communicates with the network side device, and there is no need to perform forwarding through the auxiliary device, which improves communication efficiency.

An embodiment of this application further provides a network side device, including a processor and a communication interface. The communication interface is configured to obtain first information, and the processor is configured to schedule cell handover according to the first information, where the first information includes at least one of the following: measurement results of a first serving cell and at least one first cell of a terminal, or scheduling information; the first cell is a neighboring cell of the first serving cell, or a second serving cell of the terminal; and the first serving cell and the at least one first cell are cells sharing an auxiliary device. The embodiment of the network side device corresponds to the method embodiment of the network side device. All implementation processes of the method embodiment are applicable to the embodiment of the network side device and can achieve the same technical effects.

Figure 15:
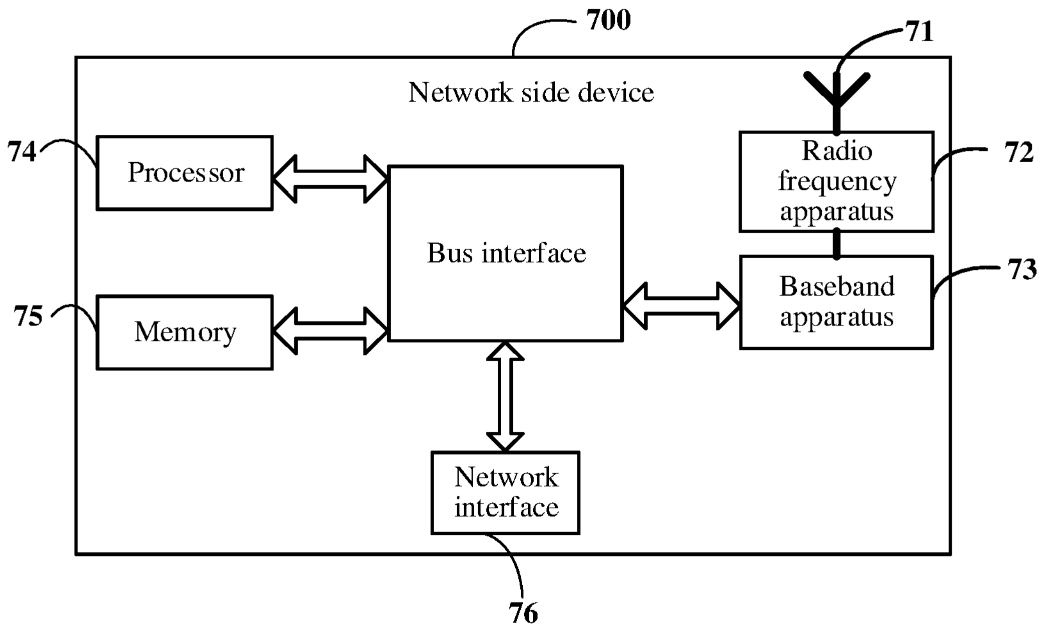
FIG. 15 is a schematic structural diagram of a network side device according to an embodiment of this application.

Optionally, an embodiment of this application further provides a network side device. As shown in FIG. 15, the network side device 700 includes an antenna 71, a radio frequency apparatus 72, and a baseband apparatus 73. The antenna 71 is connected to the radio frequency apparatus 72. In an uplink direction, the radio frequency apparatus 72 receives information by using the antenna 71, and sends the received information to the baseband apparatus 73 for processing. In a downlink direction, the baseband apparatus 73 processes to-be-processed information, and sends the information to the radio frequency apparatus 72. The radio frequency apparatus 72 processes received information and sends the information by using the antenna 71.

The frequency band processing apparatus may be located in the baseband apparatus 73, and the method performed by the network side device in the foregoing embodiments may be implemented in the baseband apparatus 73. The baseband apparatus 73 includes a processor 74 and a memory 75.

The baseband apparatus 73 may include, for example, at least one baseband plate. A plurality of chips are arranged on the baseband plate. As shown in FIG. 15, one of the plurality of chips is, for example, the processor 74, and is connected to the memory 75, to invoke a program in the memory 75 to perform operations performed by the network side device in the foregoing method embodiment.

The baseband apparatus 73 may further include a network interface 76, configured to exchange information with the radio frequency apparatus 72. The interface is, for example, a common public radio interface (CPRI).

Optionally, the network side device in this embodiment of this application further includes: instructions or a program stored in the memory 75 and executable on the processor 74, and the processor 74 invokes the instructions or program in the memory 75 to perform the method performed by the modules shown in FIG. 11, and can achieve the same technical effect. To avoid repetition, details are not described herein again.

An embodiment of this application further provides a non-transitory readable storage medium, storing a program or instructions, where when the program or instructions are executed by a processor, the processes of the embodiments of the cell handover method are implemented, and the same technical effect can be achieved. To avoid repetition, details are not described herein again.

The processor is a processor in the terminal in the foregoing embodiments. The non-transitory readable storage medium includes a non-transitory computer-readable storage medium, for example, a read-only memory (ROM), a random access memory (RAM), a magnetic disk, an optical disk, or the like.

An embodiment of this application further provides a chip, including a processor and a communication interface coupled to each other, the processor being configured to execute a program or instructions to implement the processes of the embodiments of the cell handover method, and can achieve the same technical effects. To avoid repetition, details are not described herein again.

It should be understood that, the chip mentioned in this embodiment of this application may also be referred to as a system-level chip, a system chip, a chip system, a system on chip, or the like.

An embodiment of this application further provides a computer program/program product, where the computer program/program product is stored in a non-transitory storage medium, and the computer program/program product is executed by at least one processor to implement the processes of the embodiments of the cell handover method, and can achieve the same technical effects. To avoid repetition, details are not described herein again.

It is to be noted that, the term such as "include", "comprise", or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Unless otherwise specified, elements defined by the sentence "including one" does not exclude that there are still other same elements in the processes, methods, objects, or apparatuses. In addition, it is to be noted that, the scope of the method and the apparatus in the embodiments of this application is not limited to executing functions in an order shown or discussed, and may also include executing the functions in a substantially simultaneous manner or in a reverse order according to involved functions. For example, the described method may be performed in an order different from that described order, and various steps may also be added, omitted, or combined. In addition, features described with reference to some examples may also be combined in other examples.

According to the descriptions of the foregoing embodiments, a person skilled in the art may clearly understand that the method according to the foregoing embodiments may be implemented through software and a necessary general hardware platform, and certainly, may alternatively be implemented by hardware. Based on such an understanding, the technical solutions of this application essentially or the part contributing to the related art may be implemented in the form of a computer software product. The computer software product is stored in a storage medium (such as a read-only memory (ROM)/random access memory (RAM), a magnetic disk, or an optical disc), and includes several instructions for instructing a terminal (which may be a mobile phone, a computer, a server, a network device, or the like) to perform the method described in the embodiments of this application.

The embodiments of this application are described above with reference to the accompanying drawings. However, this application is not limited to the foregoing implementations. The foregoing implementations are merely illustrative rather than limitative. A person of ordinary skill in the art may derive various forms from this application without departing from the spirit of this application and the scope claimed by the claims, which are all under the protection of this application.

What is claimed is:

1. A cell handover method, comprising:

obtaining, by a network side device, first information; and scheduling, by the network side device, cell handover according to the first information, wherein the first information comprises at least one of the following: measurement results of a first serving cell and at least one first cell, or scheduling information; the first cell is a neighboring cell of the first serving cell, or a second serving cell of a terminal; and the first serving cell and the at least one first cell are cells sharing an auxiliary device; and before scheduling, by the network side device, the cell handover according to the first information, the method further comprises:

determining, by the network side device, that the terminal is within coverage of the auxiliary device according to a measurement result of a forwarded beam of the auxiliary device and a measurement result of a beam directly sent by the network side device.

2. The cell handover method according to claim 1, wherein in a case that the first information comprises the measurement results of the first serving cell and the at least one first cell of the terminal, scheduling, by the network side device, the cell handover according to the first information comprises:

scheduling, by the network side device, the cell handover according to the measurement results of the first serving cell and the at least one first cell, and a working status of the auxiliary device.

3. The cell handover method according to claim 2, wherein scheduling, by the network side device, the cell handover according to the measurement results of the first serving cell and the at least one first cell of the terminal, and the working status of the auxiliary device comprises:

in a case that the auxiliary device does not work, scheduling, by the network side device, cell handover according to a measurement result of the first serving cell and a measurement result of the at least one first cell; and in a case that the auxiliary device works, scheduling, by the network side device, cell handover according to measurement results of the first serving cell and the at least one first cell of the terminal in a same beam forwarded by the auxiliary device.

4. The cell handover method according to claim 3, wherein scheduling, by the network side device, the cell handover according to the measurement result of the first serving cell and the measurement result of the at least one first cell of the terminal comprises:

scheduling, by the network side device, cell handover in a case that a difference between a measurement result of a second cell and the measurement result of the first serving cell is greater than a first threshold;

or scheduling, by the network side device, the cell handover according to the measurement results of the first serving cell and the at least one first cell of the terminal in a same beam forwarded by the auxiliary device comprises:

scheduling, by the network side device, cell handover in a case that a difference between measurement results of the second cell and the first serving cell in the same beam forwarded by the auxiliary device is greater than a second threshold, wherein the second cell is any cell in the at least one first cell.

5. The cell handover method according to claim 2, wherein scheduling, by the network side device, the cell handover according to the measurement results of the first serving cell and the at least one first cell of the terminal, and the working status of the auxiliary device comprises:

in a case that a serving cell of the terminal comprises the first serving cell and at least one second serving cell, scheduling, by the network side device, primary and secondary serving cell handover according to measurement results of the first serving cell and the at least one second serving cell, and the working status of the auxiliary device; or in a case that the serving cell of the terminal comprises only the first serving cell, scheduling, by the network side device, cell handover according to measurement results of the first serving cell and at least one neighboring cell, and the working status of the auxiliary device.

6. The cell handover method according to claim 1, wherein the scheduling information comprises at least one of the following: a quantity of terminals within coverage of the auxiliary device, service information of the terminal, or forwarded beam information of the auxiliary device.

7. The cell handover method according to claim 6, wherein the scheduling information comprises the forwarded beam information of the auxiliary device, the forwarded beam information comprises a primary-secondary relationship that is of the network side device and is corresponding to a forwarded beam, and scheduling, by the network side device, the cell handover according to the first information comprises:

in a case that a serving cell of the terminal comprises the first serving cell and the at least one second serving cell, scheduling, by the network side device, primary and secondary serving cell handover according to a position of the terminal and the primary-secondary relationship of the network side device corresponding to the forwarded beam of the auxiliary device, wherein the primary-secondary relationship corresponding to the forwarded beam is determined according to coverage of the forwarded beam of the auxiliary device and a relative position of a network side device corresponding to each serving cell.

8. The cell handover method according to claim 4, wherein scheduling, by the network side device, the cell handover according to the first information comprises:

sending, by the network side device, a handover indication message to the terminal, wherein the handover indication message is used for indicating to hand over from the first serving cell to the second cell or perform primary and secondary serving cell handover, and indicating configuration information of the second cell, the configuration information of the second cell comprising at least one of the following: configuration information of a synchronization signal block (SSB) of the second cell, system information of the second cell, or configuration information of a physical downlink control channel (PDCCH) of the second cell.

9. The cell handover method according to claim 1, wherein before determining that the terminal is within coverage of the auxiliary device, the method further comprises:

sending, by the network side device, configuration information of the auxiliary device to the terminal, wherein the configuration information of the auxiliary device comprises at least one of the following: a quantity of cells sharing the auxiliary device, a physical cell identifier PCI, a usage time of the auxiliary device, a usage period of the auxiliary device, or a time-frequency domain configuration parameter of a reference signal;

or after determining that the terminal is within coverage of the auxiliary device, the method further comprises:

receiving, by the network side device, measurement results that are sent by the terminal and that are of the first serving cell and at least one third cell in a same beam forwarded by the auxiliary device; and configuring, by the network side device according to the measurement results, an access parameter of the at least one third cell for the terminal;

or after determining that the terminal is within coverage of the auxiliary device, the method further comprises:

receiving, by the network side device, a connection establishment request sent by the terminal, wherein the connection establishment request is used for requesting to establish a connection with at least one third cell; and the connection establishment request is triggered in a case that a first condition is met, and the first condition comprises that a difference between a measurement result of a third cell in a same beam forwarded by the auxiliary device and a measurement result of the first serving cell in the same beam forwarded by the auxiliary device is less than or equal to a third threshold; and configuring, by the network side device according to the connection establishment request, an access parameter of the at least one third cell for the terminal.

10. The cell handover method according to claim 9, wherein the first condition further comprises at least one of the following that:

the measurement result of the third cell in the same beam forwarded by the auxiliary device is greater than or equal to a fourth threshold;

a difference between the measurement result of the third cell in the same beam forwarded by the auxiliary device and a measurement result of the third cell in a second condition is greater than a fifth threshold;

the measurement result of the third cell in the second condition is greater than or equal to a sixth threshold; or a time difference of arrival between a downlink frame boundary of the third cell and a downlink frame boundary of the first serving cell is less than or equal to a seventh threshold, wherein the second condition comprises that the auxiliary device does not work or a beam forwarded by the auxiliary device does not point to the terminal.

11. The cell handover method according to claim 1, wherein the method further comprises:

sending, by the network side device, measurement configuration information of each third cell to the terminal, the measurement configuration information comprising at least one of the following: a reference signal, a measurement period, a measurement time window, or a quantity of measurements.

12. The cell handover method according to claim 9, wherein the method further comprises:

sending, by the network side device, timing advance (TA) to the terminal, the TA being used by the terminal to perform communication on the first serving cell and each first cell.

13. The cell handover method according to claim 1, wherein the method further comprises:

receiving, by the network side device, indication information sent by the terminal, the indication information being used for indicating that the terminal directly communicates with the network side device; and sending, by the network side device, a notification message to a network side device of each first cell, the notification message being used for indicating the network side device of each first cell to disconnect from the terminal.

14. A network side device, comprising a processor, a memory, and a program or instructions stored in the memory and executable on the processor, wherein the program or instructions, when executed by the processor, causes the network side device to perform:

obtaining first information; and scheduling cell handover according to the first information, wherein the first information comprises at least one of the following: measurement results of a first serving cell and at least one first cell, or scheduling information; the first cell is a neighboring cell of the first serving cell, or a second serving cell of a terminal; and the first serving cell and the at least one first cell are cells sharing an auxiliary device; and before scheduling, by the network side device, the cell handover according to the first information, the method further comprises:

determining, by the network side device, that the terminal is within coverage of the auxiliary device according to a measurement result of a forwarded beam of the auxiliary device and a measurement result of a beam directly sent by the network side device.

15. The network side device according to claim 14, wherein the first information comprises the measurement results of the first serving cell and the at least one first cell of the terminal, and the program or instructions, when executed by the processor, causes the network side device to perform:

scheduling the cell handover according to the measurement results of the first serving cell and the at least one first cell, and a working status of the auxiliary device.

16. The network side device according to claim 15, wherein the program or instructions, when executed by the processor, causes the network side device to perform:

in a case that the auxiliary device does not work, scheduling cell handover according to a measurement result of the first serving cell and a measurement result of the at least one first cell; and in a case that the auxiliary device works, scheduling the cell handover according to measurement results of the first serving cell and the at least one first cell of the terminal in a same beam forwarded by the auxiliary device.

17. The network side device according to claim 16, wherein the program or instructions, when executed by the processor, causes the network side device to perform:

scheduling the cell handover in a case that a difference between a measurement result of a second cell and the measurement result of the first serving cell is greater than a first threshold;

or scheduling cell handover in a case that a difference between measurement results of the second cell and the first serving cell in the same beam forwarded by the auxiliary device is greater than a second threshold, wherein the second cell is any cell in the at least one first cell.

18. The network side device according to claim 15, wherein the program or instructions, when executed by the processor, causes the network side device to perform:

in a case that a serving cell of the terminal comprises the first serving cell and at least one second serving cell, scheduling, by the network side device, primary and secondary serving cell handover according to measurement results of the first serving cell and the at least one second serving cell, and the working status of the auxiliary device; or in a case that the serving cell of the terminal comprises only the first serving cell, scheduling, by the network side device, cell handover according to measurement results of the first serving cell and at least one neighboring cell, and the working status of the auxiliary device.

19. The network side device according to claim 14, wherein the scheduling information comprises at least one of the following: a quantity of terminals within coverage of the auxiliary device, service information of the terminal, or forwarded beam information of the auxiliary device.

20. The network side device according to claim 19, wherein the scheduling information comprises the forwarded beam information of the auxiliary device, the forwarded beam information comprises a primary-secondary relationship that is of the network side device and is corresponding to a forwarded beam, and the program or instructions, when executed by the processor, causes the network side device to perform:

in a case that a serving cell of the terminal comprises the first serving cell and the at least one second serving cell, scheduling primary and secondary serving cell handover according to a position of the terminal and the primary-secondary relationship of the network side device corresponding to the forwarded beam of the auxiliary device, wherein the primary-secondary relationship corresponding to the forwarded beam is determined according to coverage of the forwarded beam of the auxiliary device and a relative position of a network side device corresponding to each serving cell.

* * * * *